United States Patent
Tanimoto et al.

(10) Patent No.: US 6,938,430 B2
(45) Date of Patent: Sep. 6, 2005

(54) REFRIGERATING DEVICE

(75) Inventors: Kenji Tanimoto, Osaka (JP); Masaaki Takegami, Osaka (JP); Satoru Sakae, Oaska (JP)

(73) Assignee: Daikin Industries, Ltd., Osaka (JP)

( * ) Notice: Subject to any disclaimer, the term of this patent is extended or adjusted under 35 U.S.C. 154(b) by 168 days.

(21) Appl. No.: 10/472,463

(22) PCT Filed: Jan. 23, 2003

(86) PCT No.: PCT/JP03/00614

§ 371 (c)(1),
(2), (4) Date: Sep. 22, 2003

(87) PCT Pub. No.: WO03/062718

PCT Pub. Date: Jul. 31, 2003

(65) Prior Publication Data

US 2004/0112082 A1 Jun. 17, 2004

(30) Foreign Application Priority Data

Jan. 24, 2002 (JP) ........................ 2002-015958

(51) Int. Cl.⁷ ................................. F25B 1/10
(52) U.S. Cl. .................. 62/196.2; 62/200; 62/228.5; 62/510
(58) Field of Search ................ 62/196.2, 199, 62/200, 228.5, 510

(56) References Cited

U.S. PATENT DOCUMENTS

| | | | |
|---|---|---|---|
| 2,245,053 A | * | 6/1941 | Sanders, Jr. ............. 62/200 |
| 4,628,700 A | * | 12/1986 | Alsenz .................. 62/152 |
| 4,637,220 A | * | 1/1987 | Sakano .................. 62/200 |
| 5,065,591 A | * | 11/1991 | Shaw ................... 62/175 |
| 6,131,401 A | | 10/2000 | Ueno et al. |
| 6,698,217 B2 | * | 3/2004 | Tanimoto et al. ........... 62/175 |

FOREIGN PATENT DOCUMENTS

| | | |
|---|---|---|
| EP | 0 744 581 A2 | 11/1996 |
| JP | 61-134544 A | 6/1986 |
| JP | 62-21888 Y2 | 6/1987 |
| JP | 1-42844 B2 | 9/1989 |
| JP | 3-177757 A | 8/1991 |
| JP | 7-139827 A | 6/1995 |
| JP | 2001-280729 A | 10/2001 |

* cited by examiner

Primary Examiner—William E. Tapolcai
(74) Attorney, Agent, or Firm—Birch, Stewart, Kolasch & Birch, LLP

(57) ABSTRACT

A refrigerating apparatus including three compressors (2A, 2B, 2C) and application side heat exchangers (41) (45, 51) for two channels is formed so that a first compressor (2A) is used only for the application side heat exchangers (45, 51) in a first channel of a circuit, a third compressor (2C) is used only for the application side heat exchanger (41) in a second channel of the circuit, and a second compressor (2B) is used in a switchable manner between the application side heat exchangers (45, 51) in the first channel of the circuit and the application side heat exchanger (41) in the second channel of the circuit. Thus, not only the pipe arrangement at suction side is simplified, but also operation control is streamlined.

20 Claims, 11 Drawing Sheets

REFRIGERATING DEVICE

This application is the national phase under 35 U.S.C. §371 of PCT International Application No. PCT/JP03/00614 which has an International filing date of Jan. 23, 2003, which designated the United States of America.

TECHNICAL FIELD

The present invention relates to a refrigerating apparatus, and more particularly relates to a refrigerating apparatus in which compressor mechanisms are formed by combining three compressor means.

BACKGROUND ART

A refrigerating apparatus for carrying out a refrigeration cycle has conventionally been known, and has widely been used as an air conditioner for cooling and heating the air in a room, and a cooler such as a refrigerator, a freezer or a showcase for storing foods. As disclosed in WO98/45651, some refrigerating apparatuses of this type carry out both of an air conditioning operation and a cold storage/freezing operation. For example, a refrigerating apparatus of this type includes application side heat exchangers for two channels such as an air conditioning heat exchanger and a cooling heat exchanger for a cold storage/freezing operation, and is installed in a convenience store and the like.

Actually, in order to widely change compressor displacement in accordance with the operating status of a plurality of application side heat exchangers, a refrigerating apparatus of this type sometimes combines a plurality of compressors (compressor means) to form a compressor mechanism for a refrigerant circuit. For example, the present applicant has proposed an apparatus in which compressor mechanisms are formed by combining three compressor means, the compressor mechanisms are provided at the suction side thereof with a four-way selector valve, and the communication of four ports of the four-way selector valve is switched, thus appropriately selecting, from among the three compressor means, the compressor means to be used for an air conditioning operation and the compressor means to be used for a cold storage/freezing operation (see Japanese Patent Application No. 2001-233329 and Japanese Patent Application No. 2002-024361 that claims domestic priority therefrom, for example). More specifically, the three compressor means may all be used for a cold storage/freezing operation, or two compressor means may be used for a cold storage/freezing operation while one compressor means may be used for an air conditioning operation; namely, the above-mentioned refrigerating apparatus is formed so that when the apparatus is operated, the three compressor means are freely combined in various patterns.

PROBLEMS TO BE SOLVED

However, in a refrigerating apparatus including three compressor means and application side heat exchangers for two channels, there arises the need for complicating pipe arrangement at the suction side of the compressor means in order to utilize the compressor means by freely combining them in various patterns. Furthermore, in the refrigerating apparatus, in order to realize various operating patterns of the compressor means, complicated control performed in accordance with operating status is also needed.

The present invention has been made in view of the above-described problems and its object is to simplify the pipe arrangement at the suction side and to streamline operation control in a refrigerating apparatus including three compressor means and application side heat exchangers for two channels.

DISCLOSURE OF INVENTION

In the present invention, one of three compressor means is used only for application side heat exchangers in a first channel, another one of the three compressor means is used only for an application side heat exchanger in a second channel, and the remaining one of the three compressor means can be used in a switchable manner between the application side heat exchangers in the first channel and the second channel.

To be more specific, a first solution provided by the present invention is based on a refrigerating apparatus in which compressor mechanisms (2D, 2E) of a refrigerant circuit (1E) including application side heat exchangers (41) (45, 51) for two channels are formed by combining three compressor means (2A, 2B, 2C).

Furthermore, the refrigerating apparatus is characterized in that the compressor means (2A, 2B, 2C) include: a first compressor means (2A) used only for the application side heat exchangers (45, 51) in the first channel of the circuit; a second compressor means (2B) used in a switchable manner between the application side heat exchangers (45, 51) in the first channel of the circuit, and the application side heat exchanger (41) in the second channel of the circuit; and a third compressor means (2C) used only for the application side heat exchanger (41) in the second channel of the circuit. "Compressor means" described herein may each be formed by a single compressor or a plurality of compressors connected in parallel, for example.

In the first solution, a refrigerant discharged from the first compressor means (2A) circulates through the first channel of the circuit, and a refrigerant discharged from the third compressor means (2C) circulates through the second channel of the circuit. In addition, the second compressor means (2B) allows a refrigerant discharged therefrom to be switchable between a circulation through the first channel of the circuit, and a circulation through the second channel of the circuit.

Besides, a second solution provided by the present invention is based on the first solution and is characterized by employing the following arrangement. Specifically, the suction side of the compressor mechanisms (2D, 2E) is connected with a four-way selector valve (3C), and the four-way selector valve (3C) is formed to be switchable between a first state in which a first port (P1) and a second port (P2) are communicated with each other and a third port (P3) and a fourth port (P4) are communicated with each other, and a second state in which the first port (P1) and the fourth port (P4) are communicated with each other and the second port (P2) and the third port (P3) are communicated with each other. Further, a low-pressure pipe (15) in the first channel of the circuit is connected to a suction pipe (6a) of the first compressor means (2A), and the first port (P1) is connected with a branch pipe (6d) of the suction pipe (6a) of the first compressor means (2A) via a check valve (7) for allowing the flow of a refrigerant toward the first port (P1). The second port (P2) is connected with a suction pipe (6b) of the second compressor means (2B). Low-pressure pipes (9, 17) in the second channel of the circuit are connected to a suction pipe (6c) of the third compressor means (2C), and the third port (P3) is connected with a branch pipe (6e) of the suction pipe (6c) of the third compressor means (2C) via another check valve (7) for allowing the flow of a refrigerant toward the third port (P3). And the fourth port (P4) is connected with a pipe (28a) at a high pressure side of the refrigerant circuit (1E). Moreover, the apparatus is formed to allow switching between a status in which a refrigerant discharged from the second compressor means (2B) circulates through the first channel of the circuit by setting the four-way selector valve (3C) to the first state, and another status in which the refrigerant discharged from the second compressor means (2B) circulates through the second channel of the circuit by setting the four-way selector valve (3C) to the second state.

In the second solution, if the four-way selector valve (3C) is switched to the first state, the refrigerant flowing through the first channel of the circuit is sucked into the first compressor means (2A) and second compressor means (2B), and the refrigerant flowing through the second channel of the circuit is sucked into the third compressor means (2C). On the other hand, if the four-way selector valve (3C) is switched to the second state, the refrigerant flowing through the first channel of the circuit is sucked into the first compressor means (2A), and the refrigerant flowing through the second channel of the circuit is sucked into the second compressor means (2B) and third compressor means (2C). In this manner, the use of the second compressor means (2B) can be switched between the first channel and the second channel.

Furthermore, a third solution provided by the present invention is based on the first or second solution, and is characterized in that: the application side heat exchangers (45, 51) in the first channel of the circuit are cooling heat exchangers used for a cold storage/freezing operation, and the application side heat exchanger (41) in the second channel of the circuit is an air conditioning heat exchanger used for an air conditioning operation; and the refrigerant circuit (1E) is formed so that refrigerants in the application side heat exchangers (45, 51) in the first channel and the application side heat exchanger (41) in the second channel are evaporated at different temperatures.

In the third solution, when a refrigerant is circulated through the first channel of the circuit, the air inside of a refrigerator or freezer, for example, is cooled by the cooling heat exchangers (45, 51), and when a refrigerant is circulated through the second channel of the circuit, the air in a room is cooled by the air conditioning heat exchanger (41). In addition, the refrigerants in the cooling heat exchangers (45, 51) and air conditioning heat exchanger (41) are evaporated at different temperatures; thus, the insides of the refrigerator or freezer and the room are each cooled to an optimum temperature.

Besides, a fourth solution provided by the present invention is based on the third solution, and is characterized in that the refrigerant circuit (1E) is formed so that a selection can be made from: an air conditioning operation in which a refrigerant discharged from at least one of the second compressor means (2B) and the third compressor means (2C) circulates through the second channel of the circuit; a cooling operation in which a refrigerant discharged from at least one of the first compressor means (2A) and the second compressor means (2B) circulates through the first channel of the circuit; and an air conditioning and cooling operation in which a refrigerant discharged from the third compressor means (2C) circulates through the second channel of the circuit, a refrigerant discharged from the first compressor means (2A) circulates through the first channel of the circuit, and a refrigerant discharged from the second compressor means (2B) is allowed to circulate through the first channel or the second channel of the circuit.

In the fourth solution, the use of the second compressor means (2B) is appropriately switched between the first channel and the second channel based on, for example, how the state of the four-way selector valve (3C) is set, thus allowing switching among air conditioning operation, cooling (cold storage/freezing) operation, and air conditioning and cooling operation.

Further, a fifth solution provided by the present invention is based on the first or second solution, and is characterized in that the first compressor means (2A) is formed by a variable displacement compressor, and the second compressor means (2B) and the third compressor means (2C) are each formed by a fixed displacement compressor.

Furthermore, a sixth solution provided by the present invention is based on the first or second solution, and is characterized in that the apparatus is formed to operate so that if a capacity deficiency occurs either in the application side heat exchangers (45, 51) in the first channel of the circuit, or in the application side heat exchanger (41) in the second channel of the circuit, the second compressor means (2B) is switched to the channel suffering the capacity deficiency.

In the sixth solution, if a capacity deficiency occurs either in the application side heat exchangers (45, 51) in one channel or in the application side heat exchanger (41) in the other channel during the operation of the apparatus, the apparatus can be operated so that the second compressor means (2B) is switched to the channel suffering the capacity deficiency. To be more specific, if a capacity deficiency occurs in the second channel when the second compressor means (2B) is used for the first channel and the capacity thereof is satisfactory, or if a capacity deficiency occurs in the first channel when the second compressor means (2B) is used for the second channel and the capacity thereof is satisfactory, the second compressor means (2B) can be switched to the channel suffering the capacity deficiency. In such a case, the second compressor means (2B) is put into a state for supporting the channel suffering the capacity deficiency. Consequently, the capacity deficiency in this channel is redressed.

In addition, a seventh solution provided by the present invention is based on the sixth solution, and is characterized in that: during operation, a higher priority is given to the capacity of the application side heat exchangers (45, 51) in the first channel of the circuit than to that of the application side heat exchanger (41) in the second channel of the circuit; and the apparatus is formed to operate so that if a capacity deficiency occurs in the application side heat exchangers (45, 51) in the first channel of the circuit, the second compressor means (2B) is switched to the first channel irrespective of the state of the application side heat exchanger (41) in the second channel of the circuit.

In the seventh solution, in the case where the first channel is used for a cold storage/freezing operation while the second channel is used for an air conditioning operation, for example, the occurrence of a capacity deficiency in the first channel will necessarily be followed by the switching of the second compressor means (2B) to the first channel. Therefore, it is possible to carry out the operation in which a higher priority is given to cold storage/freezing capacity.

Effects

According to the first solution, the refrigerant discharged from the first compressor means (2A) is fixedly circulated through only the first channel of the circuit, and the refrigerant discharged from the third compressor means (2C) is fixedly circulated through the second channel of the circuit, while the refrigerant discharged from the second compressor means (2B) is circulated through the first channel of the circuit and circulated through the second channel of the circuit in a switchable manner. That is, the first compressor means (2A) is fixedly used in the first channel, the third compressor means (2C) is fixedly used in the second channel, and the second compressor means (2B) can be used in a switchable manner between both of the channels.

By adopting a method in which only the second compressor means (2B) is switched in this manner, the combination pattern of the three compressor means (2A, 2B, 2C) is simplified, thus simplifying the pipe arrangement at the suction side. In addition, since the number of the operating patterns of the compressor means (2A, 2B, 2C) can be reduced, the control thereof can be simplified.

Besides, according to the second solution, only by switching the four-way selector valve (3C) between the first state and the second state, the second compressor means (2B) can be switched between the first channel and the second channel, thus making it possible to carry out the switching control with ease.

Moreover, according to the third solution, the gas refrigerant evaporated in the cooling heat exchangers (45, 51), and the gas refrigerant evaporated in the air conditioning heat exchanger (41) are sucked into the compressor means (2D) in the first channel and the compressor means (2E) in the second channel, respectively; therefore, the pressure of a low-pressure refrigerant in the air conditioning heat exchanger (41) and that of a low-pressure refrigerant in the cooling heat exchangers (45, 51) can be made different from each other. That is, by making the refrigerant evaporation temperature in the air conditioning heat exchanger (41) different from that in the cooling heat exchangers (45, 51), it becomes possible to carry out a so-called "dual evaporation temperature operation" in which the refrigerant evaporation temperature in the air conditioning heat exchanger (41) is high and that in the cooing heat exchangers (45, 51) is low.

Further, by evaporating the refrigerant in the air conditioning heat exchanger (41) and that in the cooling heat exchangers (45, 51) at different temperatures, an increase in COP (coefficient of performance) can be achieved. In other words, the evaporation temperature in the air conditioning heat exchanger (41) which is required in an air conditioning (air-cooling) operation, and the evaporation temperature in the cooling heat exchangers (45, 51) which is required in a cooling operation can each be optimized, thus achieving an increase in the COP.

Furthermore, according to the fourth solution, by switching, for example, the four-way selector valve (3C) between the first state and the second state, switching among air conditioning operation, cooling (cold storage/freezing) operation, and air conditioning and cooling operation is allowed with ease.

In addition, according to the sixth solution, the second compressor means (2B) can be easily switched to the first channel for a cold storage/freezing operation, for example, or to the second channel for an air conditioning operation, for example, like the above-described solutions, and even if a capacity deficiency occurs in either of the channels, the capacity deficiency can be redressed.

Moreover, according to the seventh solution, since the capacity of the first channel and that of the second channel are assigned priorities, an operation in which a higher priority is given to the cold storage/freezing capacity is enabled in a system including a cold storage/freezing channel and an air conditioning channel. As a result, the quality of refrigerated foods or frozen foods, for example, can be maintained with certainty.

BEST MODE FOR CARRYING-OUT OF THE INVENTION

Hereinafter, an embodiment of the present invention will be described in detail with reference to the drawings.

Figure 1:
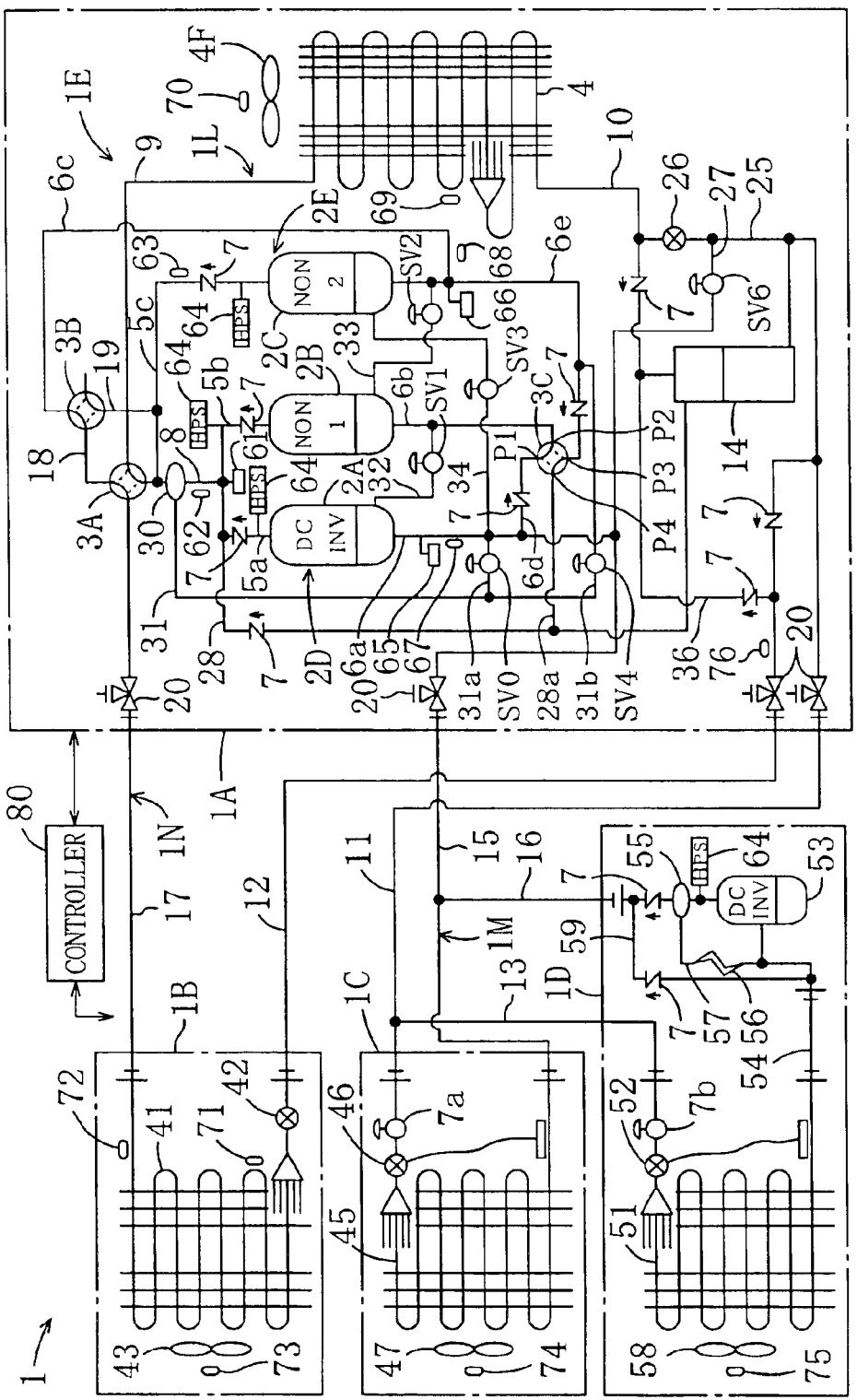
FIG. 1 is a refrigerant circuit diagram for illustrating a refrigerating apparatus according to an embodiment of the present invention.

As shown in FIG. 1, a refrigerating apparatus (1) according to the present embodiment is installed in a convenience store, and is allowed to cool showcases and air-cool and air-heat the inside of the store.

The refrigerating apparatus (1) includes: an outdoor unit (1A); an indoor unit (1B); a cold storage unit (1C); a freezing unit (1D); and a refrigerant circuit (1E) for carrying out a vapor compression refrigeration cycle. The refrigerant circuit (1E) includes: a first channel side circuit for a cold storage/freezing operation; and a second channel side circuit for an air conditioning operation. The refrigerant circuit (1E) is formed to allow switching between an air-cooling cycle and an air-heating cycle.

The indoor unit (1B) is formed to carry out an air-cooling operation and an air-heating operation in a switchable manner, and is installed at a sales floor, for example. On the other hand, the cold storage unit (1C) is installed in a showcase for cold storage, and cools the air inside the showcase. The freezing unit (1D) is installed in a showcase for freezing, and cools the air inside the showcase.

<Outdoor Unit>

The outdoor unit (1A) includes: an inverter compressor (2A) as a first compressor means; a first non-inverter compressor (2B) as a second compressor means; a second non-inverter compressor (2C) as a third compressor means; a first four-way selector valve (3A); a second four-way selector valve (3B); a third four-way selector valve (3C); and an outdoor heat exchanger (4) as a heat source side heat exchanger.

The compressors (2A, 2B, 2C) are each formed by a hermetic sealed, high-pressure dome type scroll compressor, for example. The inverter compressor (2A) is formed by a variable displacement compressor in which a motor is inverter controlled and displacement is variable in steps or in succession. The first non-inverter compressor (2B) and second non-inverter compressor (2C) are each formed by a fixed displacement compressor in which a motor is always driven at a certain number of rotations.

The inverter compressor (2A), first non-inverter compressor (2B) and second non-inverter compressor (2C) form compressor mechanisms (2D, 2E) of the refrigerating apparatus (1), and the compressor mechanisms (2D, 2E) include a compressor mechanism (2D) in the first channel and a compressor mechanism (2E) in the second channel. To be more specific, during operation, the compressor mechanisms (2D, 2E) are formed in the following manner: The compressor mechanism (2D) in the first channel is formed by the inverter compressor (2A) and first non-inverter compressor (2B) while the compressor mechanism (2E) in the second channel is formed by the second non-inverter compressor (2C), or the compressor mechanism (2D) in the first channel is formed by the inverter compressor (2A) while the compressor mechanism (2E) in the second channel is formed by the first non-inverter compressor (2B) and second non-inverter compressor (2C). That is, the inverter compressor (2A) is fixedly used in the first channel side circuit for a cold storage/freezing operation and the second non-inverter compressor (2C) is fixedly used in the second channel side circuit for an air conditioning operation, while the first non-inverter compressor (2B) can be used in a switchable manner between the first channel side circuit and the second channel side circuit.

Discharge pipes (5a, 5b, 5c) of the inverter compressor (2A), first non-inverter compressor (2B) and second non-inverter compressor (2C) are connected to a high-pressure gas pipe (discharge pipe) (8), and the high-pressure gas pipe (8) is connected to one port of the first four-way selector valve (3A). The discharge pipe (5a) of the inverter compressor (2A), the discharge pipe (5b) of the first non-inverter compressor (2B), and the discharge pipe (5c) of the second non-inverter compressor (2C) are each provided with a check valve (7).

The gas side end of the outdoor heat exchanger (4) is connected to another port of the first four-way selector valve (3A) via an outdoor gas pipe (9). The liquid side end of the outdoor heat exchanger (4) is connected with one end of a liquid pipe (10) serving as a liquid line. The liquid pipe (10) is provided at some midpoint with a receiver (14), and the other end of the liquid pipe (10) is branched into a first connecting liquid pipe (11) and a second connecting liquid pipe (12).

It should be noted that the outdoor heat exchanger (4) is a cross-fin type fine and tube heat exchanger, for example, and an outdoor fan (4F) as a heat source fan is located adjacent thereto.

Still another port of the first four-way selector valve (3A) is connected with a connecting gas pipe (17). Yet another port of the first four-way selector valve (3A) is connected to one port of the second four-way selector valve (3B) via a connecting pipe (18). Another port of the second four-way selector valve (3B) is connected to the discharge pipe (5c) of the second non-inverter compressor (2C) via an auxiliary gas pipe (19). On the other hand, still another port of the second four-way selector valve (3B) is connected with a suction pipe (6c) of the second non-inverter compressor (2C). It should be noted that yet another port of the second four-way selector valve (3B) is formed as a shut off port that is closed. In other words, the second four-way selector valve (3B) may be a three-way selector valve.

The first four-way selector valve (3A) is formed to allow switching between a first state in which the high-pressure gas pipe (8) and the outdoor gas pipe (9) are communicated with each other and in which the connecting pipe (18) and the connecting gas pipe (17) are communicated with each other (see the associated solid lines shown in FIG. 1), and a second state in which the high-pressure gas pipe (8) and the connecting gas pipe (17) are communicated with each other and in which the connecting pipe (18) and the outdoor gas pipe (9) are communicated with each other (see the associated broken lines shown in FIG. 1).

On the other hand, the second four-way selector valve (3B) is formed to allow switching between a first state in which the auxiliary gas pipe (19) and the shut off port are communicated with each other and in which the connecting pipe (18) and the suction pipe (6c) of the second non-inverter compressor (2C) are communicated with each other (see the associated solid lines shown in FIG. 1), and a second state in which the auxiliary gas pipe (19) and the connecting pipe (18) are communicated with each other and in which the suction pipe (6c) and the shut off port are communicated with each other (see the associated broken lines shown in FIG. 1).

A suction pipe (6a) of the inverter compressor (2A) is connected to a low-pressure gap pipe (15) in the first channel side circuit. The suction pipe (6c) of the second non-inverter compressor (2C) is connected to a low-pressure gas pipe (connecting gas pipe (17) or outdoor gas pipe (9)) in the second channel side circuit via the first and second four-way selector valves (3A, 3B). On the other hand, a suction pipe (6b) of the first non-inverter compressor (2B) is connected to the suction pipe (6a) of the inverter compressor (2A) and the suction pipe (6c) of the second non-inverter compressor (2C) via the after-mentioned third four-way selector valve (3C).

To be more specific, the suction pipe (6a) of the inverter compressor (2A) is connected with a branch pipe (6d), and the suction pipe (6c) of the second non-inverter compressor (2C) is connected with a branch pipe (6e). Further, the branch pipe (6d) of the suction pipe (6a) of the inverter compressor (2A) is connected to a first port (P1) of the third four-way selector valve (3C) via a check valve (7), the suction pipe (6b) of the first non-inverter compressor (2B) is connected to a second port of (P2) of the third four-way selector valve (3C), and the branch pipe (6e) of the suction pipe (6c) of the second non-inverter compressor (2C) is connected to a third port (P3) of the third four-way selector valve (3C) via a check valve (7). Furthermore, a fourth port (P4) of the third four-way selector valve (3C) is connected with an after-mentioned branch pipe (28a) of a gas vent pipe (28) from the receiver (14). The check valves provided in the branch pipes (6d, 6e) each allow only the flow of a refrigerant toward the third four-way selector valve (3C).

The third four-way selector valve (3C) is formed to allow switching between a first state in which the first port (P1) and the second port (P2) are communicated with each other and in which the third port (P3) and the fourth port (P4) are communicated with each other (see the associated solid lines shown in the drawing), and a second state in which the first port (P1) and the fourth port (P4) are communicated with each other and in which the second port (P2) and the third port (P3) are communicated with each other (see the associated broken lines shown in the drawing).

The discharge pipes (5a, 5b, 5c), the high-pressure gas pipe (8) and the outdoor gas pipe (9) constitute a high-pressure gas line (IL) during an air-cooling operation. On the other hand, the low-pressure gas pipe (15) and the suction pipes (6a, 6b) of the compressor mechanism (2D) in the first channel constitute a first low-pressure gas line (1M). Furthermore, the connecting gas pipe (17) and the suction pipe (6c) of the compressor mechanism (2E) in the second channel constitute a second low-pressure gas line (1N) during an air-cooling operation.

The first connecting liquid pipe (11), second connecting liquid pipe (12), connecting gas pipe (17) and low-pressure gas pipe (15) are extended outside of the outdoor unit (1A), and the outdoor unit (1A) is provided at its inside with shut-off valves (20) each associated with the corresponding one of these pipes. Furthermore, the second connecting liquid pipe (12) is provided with a check valve (7) at the branch side end of the liquid pipe (10), and is formed to allow a refrigerant to flow from the receiver (14) toward the shut-off valve (20).

The liquid pipe (10) is connected with an auxiliary liquid pipe (25) bypassing the receiver (14). The auxiliary liquid pipe (25) allows a refrigerant to flow therethrough mainly during an air-heating operation, and is provided with an outdoor expansion valve (26) serving as an expansion mechanism. Provided between the outdoor heat exchanger (4), connected to the liquid pipe (10), and the receiver (14) is a check valve (7) that allows only the flow of a refrigerant toward the receiver (14). This check valve (7) is located between the junction of the auxiliary liquid pipe (25), connected to the liquid pipe (10), and the receiver (14).

The liquid pipe (10) is branched between this check valve (7) and the receiver (14) (which will be called a "branch liquid pipe (36)"), and the branch liquid pipe (36) is connected between the shut-off valve (20) and check valve (7) of the second liquid pipe (12). The branch liquid pipe (36) is provided with a check valve (7) that allows only the flow of a refrigerant from the second liquid pipe (12) toward the receiver (14).

Connected between the auxiliary liquid pipe (25) and the low-pressure gas pipe (15) is a liquid injection pipe (27). This liquid injection pipe (27) is provided with a solenoid valve (SV6). Further, the gas vent pipe (28) is connected between the upper portion of the receiver (14) and the discharge pipe (5a) of the inverter compressor (2A). This gas vent pipe (28) is provided with a check valve (7) that allows only the flow of a refrigerant from the receiver (14) toward the discharge pipe (5a). Furthermore, as described above, the branch pipe (28a) of this gas vent pipe (28) is connected to the fourth port (P4) of the third four-way selector valve (3C).

The high-pressure gas pipe (8) is provided with an oil separator (30). This oil separator (30) is connected with one end of an oil return pipe (31). The other end of this oil return pipe (31) is branched into a first oil return pipe (31a) and a second oil return pipe (31b). The first oil return pipe (31a) is provided with a solenoid valve (SV0), and is connected to the suction pipe (6a) of the inverter compressor (2A). On the other hand, the second oil return pipe (31b) is provided with a solenoid valve (SV4), and is connected to the branch pipe (6e) of the suction pipe (6c) of the second non-inverter compressor (2C).

Connected between the dome (oil sump) of the inverter compressor (2A) and the suction pipe (6b) of the first non-inverter compressor (2B) is a first oil equalization pipe (32). Connected between the dome of the first non-inverter compressor (2B) and the suction pipe (6c) of the second non-inverter compressor (2C) is a second oil equalization pipe (33). Connected between the dome of the second non-inverter compressor (2C) and the suction pipe (6a) of the inverter compressor (2A) is a third oil equalization pipe (34). The first oil equalization pipe (32), second oil equalization pipe (33) and third oil equalization pipe (34) are provided with solenoid valves (SV1, SV2, SV3) each serving as an opening/closing mechanism.

<Indoor Unit>

The indoor unit (1B) includes: an indoor heat exchanger (air conditioning heat exchanger) as an application side heat exchanger; and an indoor expansion valve (42) as an expansion mechanism. The gas side of the indoor heat exchanger (41) is connected with the connecting gas pipe (17). On the other hand, the liquid side of the indoor heat exchanger (41) is connected with the second connecting liquid pipe (12) via the indoor expansion valve (42). It should be noted that the indoor heat exchanger (41) is a cross-fin type fin and tube heat exchanger, for example, and an indoor fan (43) as an application side fan is located adjacent thereto.

<Cold Storage Unit>

The cold storage unit (1C) includes: a cold storage heat exchanger (45) as a cooling heat exchanger; and a cold storage expansion valve (46) as an expansion mechanism. The liquid side of the cold storage heat exchanger (45) is connected with the first connecting liquid pipe (11) via a solenoid valve (7a) and the cold storage expansion valve (46). On the other hand, the gas side of the cold storage heat exchanger (45) is connected with the low-pressure gas pipe (15).

The cold storage heat exchanger (45) is communicated with the suction side of the compressor mechanism (2D) in the first channel, while the indoor heat exchanger (41) is communicated with the suction side of the second non-inverter compressor (2C) during an air-cooling operation. The refrigerant pressure (evaporation pressure) in the cold storage heat exchanger (45) becomes lower than the refrigerant pressure (evaporation pressure) in the indoor heat exchanger (41). As a result, the refrigerant evaporation temperature in the cold storage heat exchanger (45) becomes −10° C., for example, and the refrigerant evaporation temperature in the indoor heat exchanger (41) becomes +5° C., for example, thus allowing the refrigerant circuit (1E) to provide a circuit in which a refrigerant is evaporated at different temperatures.

It should be noted that the cold storage expansion valve (46) is a temperature-sensing type expansion valve, and a temperature sensing bulb thereof is attached to the gas side of the cold storage heat exchanger (45). The cold storage heat exchanger (45) is a cross-fin type fin and tube heat exchanger, for example, and a cold storage fan (47) as a cooling fan is located adjacent thereto.

<Freezing Unit>

The freezing unit (1D) includes: a freezing heat exchanger (51) as a cooling heat exchanger; a freezing expansion valve (52) as an expansion mechanism; and a booster compressor (53) as a freezing compressor. The liquid side of the freezing heat exchanger (51) is connected with a branch liquid pipe (13) branched from the first connecting liquid pipe (11), via a solenoid valve (7b) and the freezing expansion valve (52).

The gas side of the freezing heat exchanger (51) and the suction side of the booster compressor (53) are connected to each other through a connecting gas pipe (54). The discharge side of this booster compressor (53) is connected with a branch gas pipe (16) branched from the low-pressure gas pipe (15). This branch gas pipe (16) is provided with a check valve (7) and an oil separator (55). Connected between the oil separator (55) and the connecting gas pipe (54) is an oil return pipe (57) having a capillary tube (56).

The booster compressor (53) compresses a refrigerant in two stages between the booster compressor and the compressor mechanism (2D) in the first channel such that the refrigerant evaporation temperature in the freezing heat exchanger (51) becomes lower than the refrigerant evaporation temperature in the cold storage heat exchanger (45). The refrigerant evaporation temperature in the freezing heat exchanger (51) is set at −40° C., for example.

It should be noted that the freezing expansion valve (52) is a temperature-sensing type expansion valve, and a temperature sensing bulb thereof is attached to the gas side of the freezing heat exchanger (51). The freezing heat exchanger (51) is a cross-fin type fin and tube heat exchanger, for example, and a freezing fan (58) as a cooling fan is located adjacent thereto.

Furthermore, a bypass pipe (59) having a check valve (7) is connected between the connecting gas pipe (54), i.e., the suction side of the booster compressor (53), and the downstream side of the check valve (7) of the branch gas pipe (16), i.e., the discharge side of the booster compressor (53). The bypass pipe (59) is formed so that a refrigerant flows to bypass the booster compressor (53) at the time of deactivation, e.g., breakdown, of the booster compressor (53).

<Control System>

The refrigerant circuit (1E) is provided with various sensors and various switches. The high-pressure gas pipe (8) of the outdoor unit (1A) is provided with: a high-pressure pressure sensor (61) as a pressure detection means for detecting the pressure of a high-pressure refrigerant; and a discharge temperature sensor (62) as a temperature detection means for detecting the temperature of a high-pressure refrigerant. The discharge pipe (5c) of the second non-inverter compressor (2C) is provided with a discharge temperature sensor (63) as a temperature detection means for detecting the temperature of a high-pressure refrigerant. Furthermore, the discharge pipes (5a, 5b, 5c) of the inverter compressor (2A), first non-inverter compressor (2B) and second non-inverter compressor (2C) are each provided with a pressure switch (64) that opens when the pressure of a high-pressure refrigerant has reached a predetermined value.

The suction pipes (6a, 6c) of the inverter compressor (2A) and second non-inverter compressor (2C) are provided with: low-pressure pressure sensors (65, 66) each serving as a pressure detection means for detecting the pressure of a low-pressure refrigerant; and suction temperature sensors (67, 68) each serving as a temperature detection means for detecting the temperature of a low-pressure refrigerant.

The outdoor heat exchanger (4) is provided with an outdoor heat exchanger sensor (69) as a temperature detection means for detecting an evaporation temperature or condensation temperature which is the refrigerant temperature in the outdoor heat exchanger (4). In addition, the outdoor unit (1A) is provided with an outdoor temperature sensor (70) as a temperature detection means for detecting the temperature of an outside air.

The indoor heat exchanger (41) is not only provided with an indoor heat exchanger sensor (71) as a temperature detection means for detecting a condensation temperature or evaporation temperature which is the refrigerant temperature in the indoor heat exchanger (41), but also provided at its gas side with a gas temperature sensor (72) as a temperature detection means for detecting the temperature of a gas refrigerant. Besides, the indoor unit (1B) is provided with an indoor temperature sensor (73) as a temperature detection means for detecting the temperature of the air inside a room.

The cold storage unit (1C) is provided with a cold storage temperature sensor (74) as a temperature detection means for detecting the temperature inside the showcase for cold storage. The freezing unit (1D) is provided with a freezing temperature sensor (75) as a temperature detection means for detecting the temperature inside the showcase for freezing. Furthermore, the discharge side of the booster compressor (53) is provided with a pressure switch (64) that opens when the pressure of a discharged refrigerant has reached a predetermined value.

Provided between the shut-off valve (20) and check valve (7) of the second connecting liquid pipe (12) is a liquid temperature sensor (76) as a temperature detection means for detecting the refrigerant temperature in the second connecting liquid pipe (12).

An output signal from each of the various sensors and various switches is inputted to a controller (80). The controller (80) is configured to control the operation of the refrigerant circuit (1E), and to carry out the switching control for eight types of operation modes described below. Besides, the controller (80) controls, during the operation, the activation, deactivation and displacement of the inverter compressor (2A), the activation and deactivation of the first non-inverter compressor (2B) and second non-inverter compressor (2C), and/or the adjustment of the openings of the outdoor expansion valve (26) and indoor expansion valve (42), for example. The controller (80) also carries out the switching of each of the four-way selector valves (3A, 3B, 3C), and/or the opening and closing of the solenoid valves (SV0, SV1, SV2, SV3, SV4, SV6) of the oil return pipes (31a, 31b), oil equalization pipes (32, 33, 34) and liquid injection pipe (27).

Operation Mode

Next, the operations carried out by the refrigerating apparatus (1) will be described for each operation. In the present embodiment, the apparatus is formed so that, for example, eight types of operation modes can be set. To be more specific, the apparatus is formed to be able to carry out the following operations: 1) an air-cooling operation in which only the air-cooling operation of the indoor unit (1B) is carried out; 2) a freezing operation in which only the cooling operations of the cold storage unit (1C) and freezing unit (1D) are carried out; 3) a first air-cooling and freezing operation in which the air-cooling operation of the indoor unit (1B) and the cooling operations of the cold storage unit (1C) and freezing unit (1D) are carried out at the same time; 4) a second air-cooling and freezing operation that is an operation carried out when the air-cooling capacity of the indoor unit (1B) is deficient during the first air-cooling and freezing operation; 5) an air-heating operation in which only the air-heating operation of the indoor unit (1B) is carried out; 6) a first air-heating and freezing operation in which the air-heating operation of the indoor unit (1B) and the cooling operations of the cold storage unit (1C) and freezing unit (1D) are carried out by heat recovery operation without using the outdoor heat exchanger (4); 7) a second air-heating and freezing operation that is an operation carried out when the air-heating capacity of the indoor unit (1B) is excessive during the first air-heating and freezing operation; and 8) a third air-heating and freezing operation that is an operation carried out when the air-heating capacity of the indoor unit (1B) is deficient during the first air-heating and freezing operation.

Hereinafter, each of the above operations will be more specifically described.

<Air-Cooling Operation>

Figure 2:
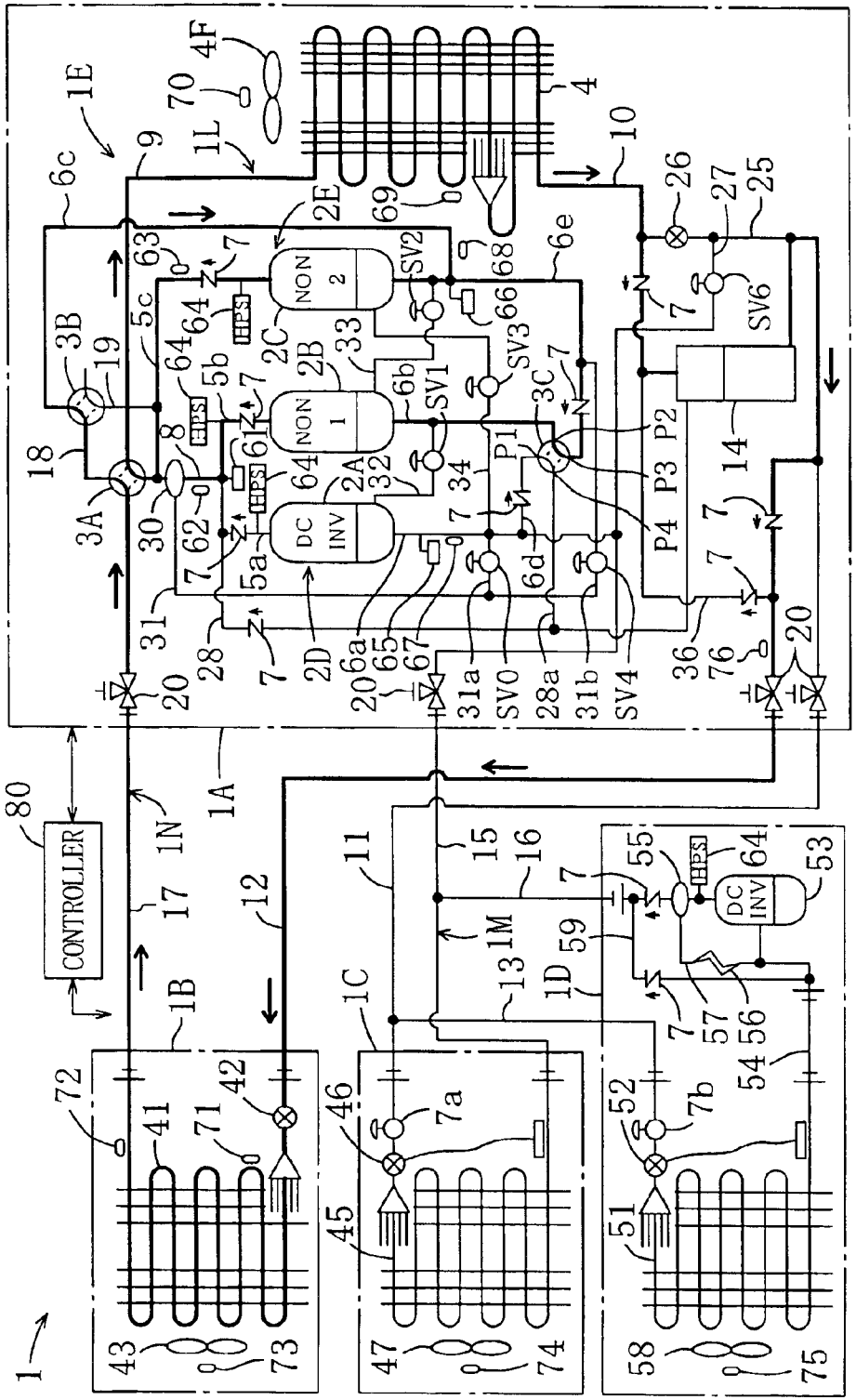
FIG. 2 is a refrigerant circuit diagram for illustrating how an air-cooling operation is carried out.

In the air-cooling operation, only the air-cooling operation of the indoor unit (1B) is carried out. During this air-cooling operation, as shown in FIG. 2, the inverter compressor (2A) forms the compressor mechanism (2D) in the first channel, and the first non-inverter compressor (2B) and second non-inverter compressor (2C) form the compressor mechanism (2E) in the second channel. And only the first non-inverter compressor (2B) and second non-inverter compressor (2C) serving as the compressor mechanism (2E) in the second channel are driven.

Further, as indicated by the associated solid lines in FIG. 2, the first four-way selector valve (3A) and second four-way selector valve (3B) are each switched to the first state, and the third four-way selector valve (3C) is switched to the second state. Furthermore, the outdoor expansion valve (26), solenoid valve (7a) of the cold storage unit (1C), and solenoid valve (7b) of the freezing unit (1D) are closed.

In such a situation, a refrigerant discharged from each of the first non-inverter compressor (2B) and second non-inverter compressor (2C) is allowed to flow from the first four-way selector valve (3A) to the outdoor heat exchanger (4) via the outdoor gas pipe (9), and is condensed. The condensed liquid refrigerant flows through the liquid pipe (10) and then flows through the second connecting liquid pipe (12) via the receiver (14), and the refrigerant further flows into the indoor heat exchanger (41) via the indoor expansion valve (42) and evaporates. The evaporated gas refrigerant flows from the connecting gas pipe (17) to the suction pipe (6c) of the second non-inverter compressor (2C) via the first four-way selector valve (3A) and second four-way selector valve (3B). A part of this low-pressure gas refrigerant is returned to the second non-inverter compressor (2C), while the other part of the gas refrigerant is diverted from the suction pipe (6c) of the second non-inverter compressor (2C) to the branch pipe (6e) and is returned to the first non-inverter compressor (2B) through the third four-way selector valve (3C). By repeating the above-described circulation of the refrigerant, the store is air-cooled.

It should be noted that, in this operating status, the activation and deactivation of the first non-inverter compressor (2B) and second non-inverter compressor (2C), and/or the opening of the indoor expansion valve (42), for example, are controlled in accordance with the air-cooling load inside the room. Only one of the compressors (2B, 2C) may be operated.

<Freezing Operation>

Figure 3:
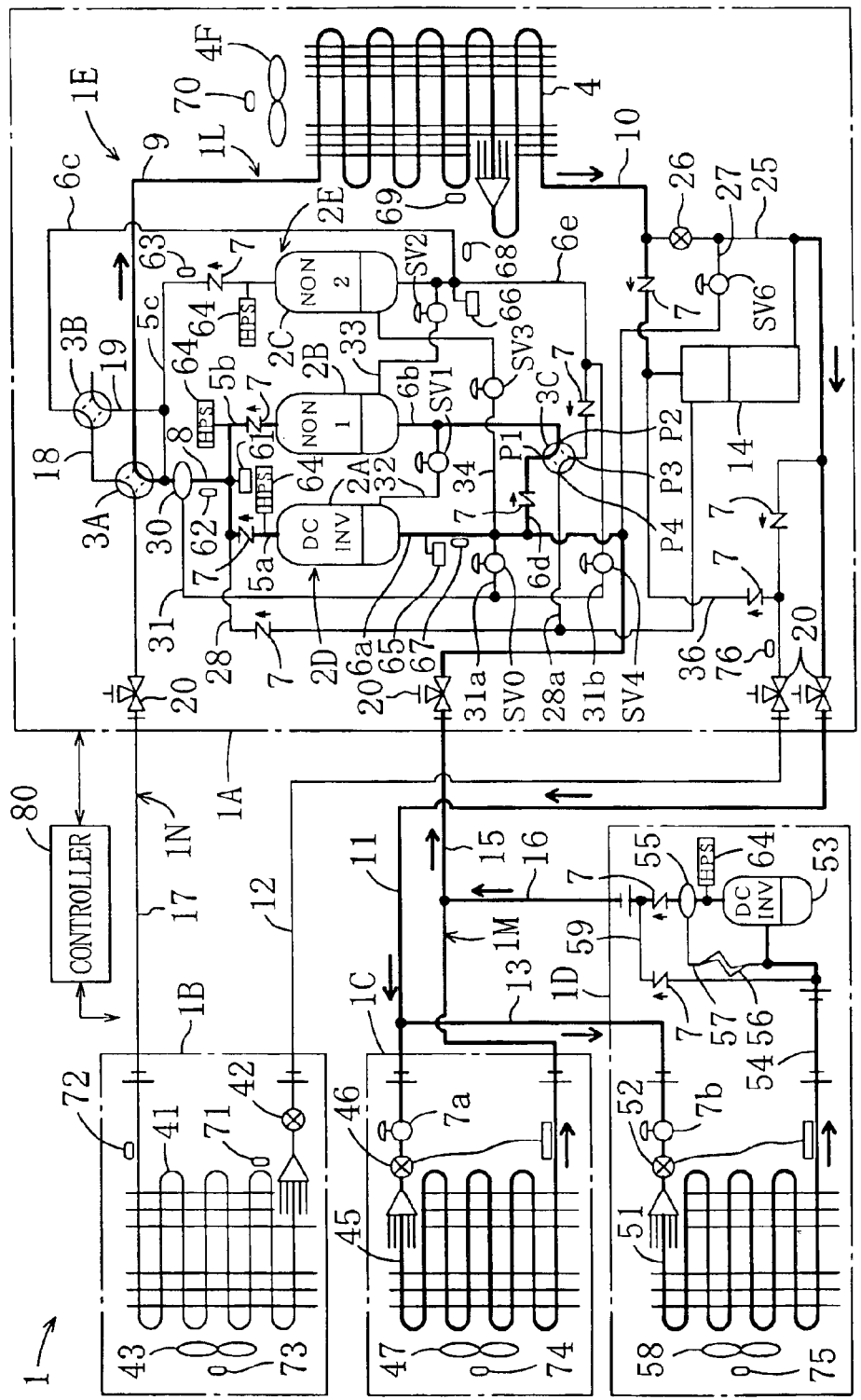
FIG. 3 is a refrigerant circuit diagram for illustrating how a freezing operation is carried out.

In the freezing operation, only the cooling operations of the cold storage unit (1C) and freezing unit (1D) are carried out. During this freezing operation, as shown in FIG. 3, the inverter compressor (2A) and first non-inverter compressor (2B) form the compressor mechanism (2D) in the first channel, and the second non-inverter compressor (2C) forms the compressor mechanism (2E) in the second channel. Moreover, not only the inverter compressor (2A) and first non-inverter compressor (2B) serving as the compressor mechanism (2D) in the first channel are driven, but also the booster compressor (53) is driven, while the second non-inverter compressor (2C) is deactivated.

Besides, as indicated by the associated solid lines in FIG. 3, the first four-way selector valve (3A) and second four-way selector valve (3B) are each switched to the first state, and the third four-way selector valve (3C) is also switched to the first state. Furthermore, the solenoid valve (7a) of the cold storage unit (1C) and the solenoid valve (7b) of the freezing unit (1D) are opened, while the outdoor expansion valve (26) and indoor expansion valve (42) are closed.

In such a situation, a refrigerant discharged from each of the inverter compressor (2A) and first non-inverter compressor (2B) is allowed to flow from the first four-way selector valve (3A) to the outdoor heat exchanger (4) via the outdoor gas pipe (9), and is condensed. The condensed liquid refrigerant flows through the liquid pipe (10) and then flows through the first connecting liquid pipe (11) via the receiver (14), and a part of the refrigerant flows into the cold storage heat exchanger (45) via the cold storage expansion valve (46) and evaporates.

On the other hand, the other part of the liquid refrigerant flowing through the first connecting liquid pipe (11) flows through the branch liquid pipe (13), and then flows into the freezing heat exchanger (51) via the freezing expansion valve (52) and evaporates. The gas refrigerant evaporated in the freezing heat exchanger (51) is sucked into the booster compressor (53) and compressed, and is then discharged to the branch gas pipe (16).

The gas refrigerant evaporated in the cold storage heat exchanger (45) and the gas refrigerant discharged from the booster compressor (53) are joined in the low-pressure gas pipe (15) and returned to the inverter compressor (2A) and first non-inverter compressor (2B). By repeating the above-described circulation of the refrigerant, the inside of the showcase for cold storage and the inside of the showcase for freezing are cooled.

Since the refrigerant in the freezing heat exchanger (51) is sucked into the booster compressor (53), the refrigerant pressure in the freezing heat exchanger (51) is lower than the refrigerant pressure in the cold storage heat exchanger (45). Consequently, the refrigerant temperature (evaporation temperature) in the freezing heat exchanger (51) becomes −40° C., and the refrigerant temperature (evaporation temperature) in the cold storage heat exchanger (45) becomes −10° C., for example.

During this freezing operation, the activation and deactivation of the first non-inverter compressor (2B), and/or the activation, deactivation or displacement of the inverter compressor (2A) are controlled based on a low-pressure refrigerant pressure (LP) detected by the low-pressure pressure sensor (65), for example, and thus the operation is carried out in accordance with the freezing load.

For example, in carrying out the control for the increase of the displacement of the compressor mechanism (2D), first, the inverter compressor (2A) is driven with the first non-inverter compressor (2B) deactivated. If the load is further increased after the displacement of the inverter compressor (2A) has been increased to its maximum, the first non-inverter compressor (2B) is driven, and at the same time, the displacement of the inverter compressor (2A) is reduced to its minimum. Thereafter, if the load is further increased, the displacement of the inverter compressor (2A) is increased while the first non-inverter compressor (2B) is kept activated. In carrying out the control for the reduction of the compressor displacement, the operation converse to the control for the increase of the compressor displacement is performed.

Furthermore, a superheat control using the temperature sensing bulbs is performed for the openings of the cold storage expansion valve (46) and freezing expansion valve (52). The same goes for each of the following operations.

<First Air-Cooling and Freezing Operation>

Figure 4:
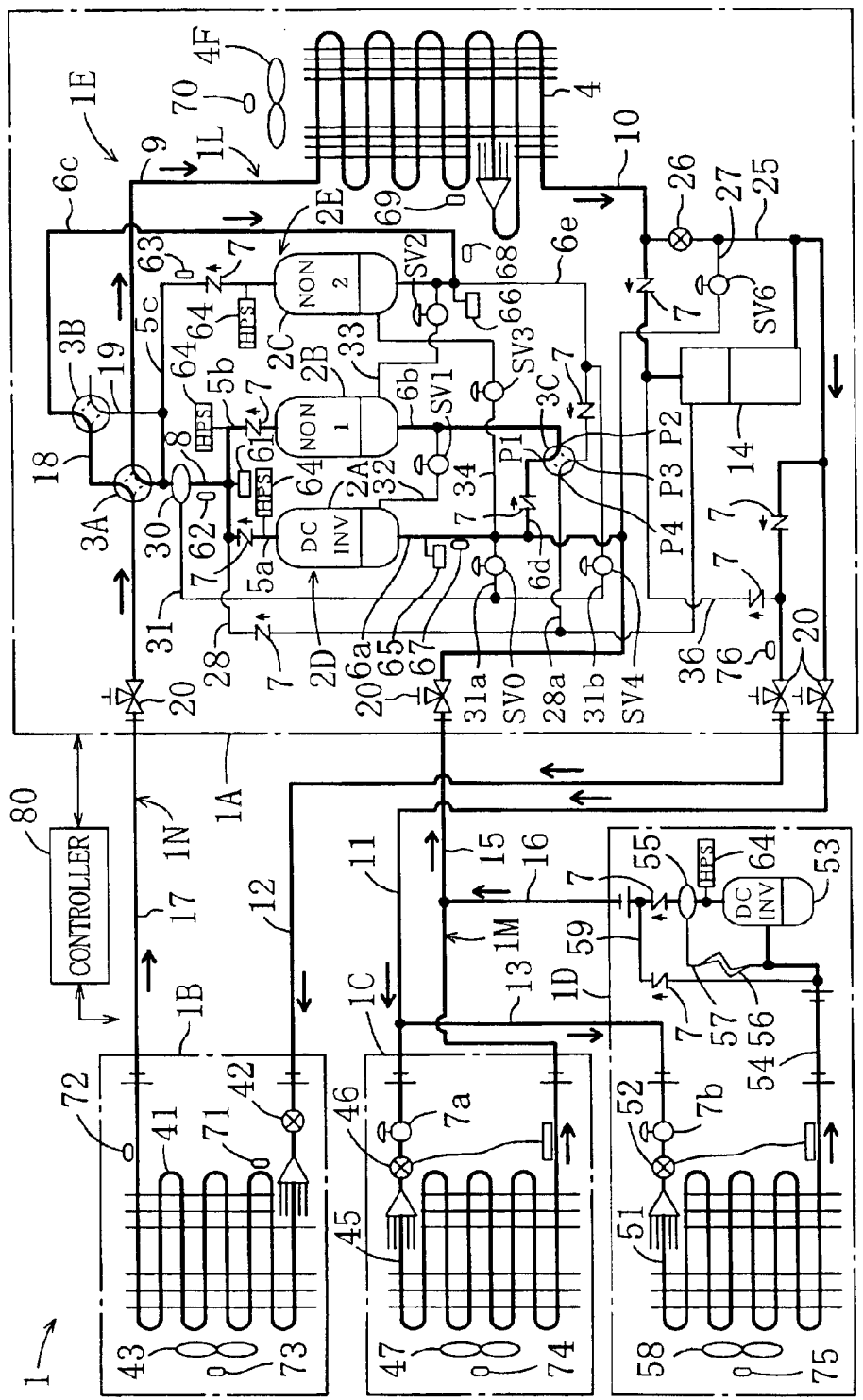
FIG. 4 is a refrigerant circuit diagram for illustrating how a first air-cooling and freezing operation is carried out.

In the first air-cooling and freezing operation, the air-cooling operation of the indoor unit (1B) and the cooling operations of the cold storage unit (1C) and freezing unit (1D) are carried out at the same time. During this first air-cooling and freezing operation, as shown in FIG. 4, the inverter compressor (2A) and first non-inverter compressor (2B) form the compressor mechanism (2D) in the first channel, and the second non-inverter compressor (2C) forms the compressor mechanism (2E) in the second channel. In addition, the inverter compressor (2A), first non-inverter compressor (2B) and second non-inverter compressor (2C) are driven, and the booster compressor (53) is also driven.

Further, the first four-way selector valve (3A), second four-way selector valve (3B) and third four-way selector valve (3C) are each switched to the first state as indicated by the associated solid lines in FIG. 4. Furthermore, the solenoid valve (7a) of the cold storage unit (1C) and the solenoid valve (7b) of the freezing unit (1D) are opened, while the outdoor expansion valve (26) is closed.

In such a situation, refrigerants discharged from the inverter compressor (2A), first non-inverter compressor (2B) and second non-inverter compressor (2C) are joined in the high-pressure gas pipe (8), flowed from the first four-way selector valve (3A) to the outdoor heat exchanger (4) via the outdoor gas pipe (9), and condensed. The condensed liquid refrigerant is allowed to flow through the liquid pipe (10) and is diverted to the first connecting liquid pipe (11) and to the second connecting liquid pipe (12) via the receiver (14).

The liquid refrigerant flowing through the second connecting liquid pipe (12) is allowed to flow into the indoor heat exchanger (41) via the indoor expansion valve (42) and evaporate. The evaporated gas refrigerant flows from the connecting gas pipe (17) to the suction pipe (6c) via the first four-way selector valve (3A) and second four-way selector valve (3B), and returns to the second non-inverter compressor (2C).

On the other hand, a part of the liquid refrigerant flowing through the first connecting liquid pipe (11) is allowed to flow into the cold storage heat exchanger (45) via the cold storage expansion valve (46) and evaporate. Furthermore, the other part of the liquid refrigerant flowing through the first connecting liquid pipe (11) is allowed to flow through the branch liquid pipe (13), and to flow into the freezing heat exchanger (51) via the freezing expansion valve (52) and evaporate. The gas refrigerant evaporated in the freezing heat exchanger (51) is sucked into the booster compressor (53) and compressed, and is then discharged to the branch gas pipe (16).

The gas refrigerant evaporated in the cold storage heat exchanger (45) and the gas refrigerant discharged from the booster compressor (53) are joined in the low-pressure gas pipe (15) and returned to the inverter compressor (2A) and first non-inverter compressor (2B).

By repeating the above-described circulation of the refrigerant, the inside of the store is air-cooled, and at the same time, the inside of the showcase for cold storage and the inside of the showcase for freezing are cooled.

<Second Air-Cooling and Freezing Operation>

Figure 5:
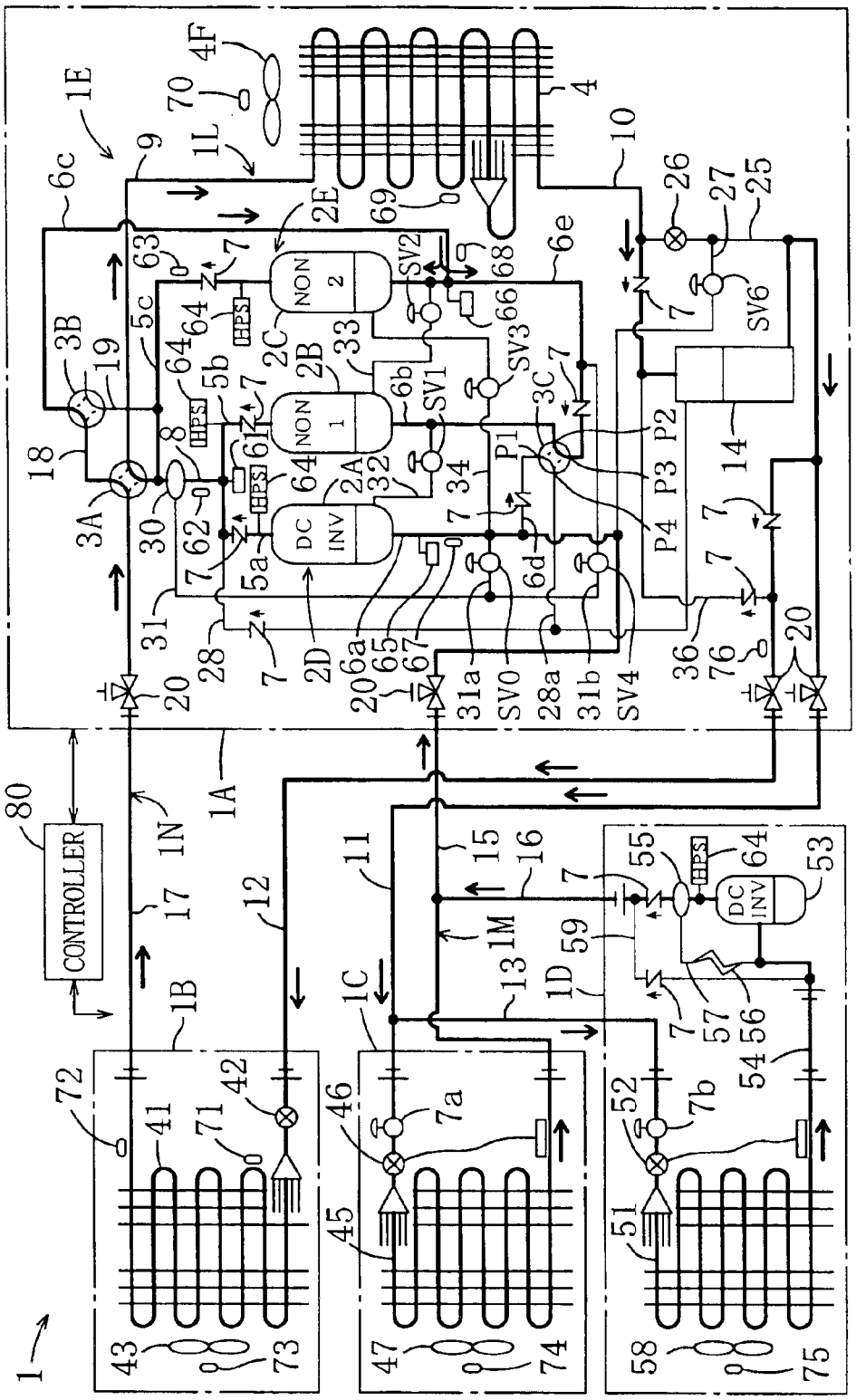
FIG. 5 is a refrigerant circuit diagram for illustrating how a second air-cooling and freezing operation is carried out.

The second air-cooling and freezing operation is carried out when the air-cooling capacity of the indoor unit (1B) is deficient during the first air-cooling and freezing operation, and switches the first non-inverter compressor (2B) to the channel for an air conditioning operation. Although the settings made for the second air-cooling and freezing operation are basically similar to those made for the first air-cooling and freezing operation as shown in FIG. 5, the second air-cooling and freezing operation differs from the first air-cooling and freezing operation in that the third four-way selector valve (3C) is switched to the second state.

Therefore, in this second air-cooling and freezing operation, like the first air-cooling and freezing operation, refrigerants discharged from the inverter compressor (2A), first non-inverter compressor (2B) and second non-inverter compressor (2C) are condensed in the outdoor heat exchanger (4), and evaporated in the indoor heat exchanger (41), cold storage heat exchanger (45) and freezing heat exchanger (51).

Furthermore, the refrigerant evaporated in the indoor heat exchanger (41) is returned to the first non-inverter compressor (2B) and second non-inverter compressor (2C), while the refrigerant evaporated in each of the cold storage heat exchanger (45) and freezing heat exchanger (51) is returned to the inverter compressor (2A). By using the two compressors (2B, 2C) in the channel for an air conditioning operation, a deficiency in the air-cooling capacity is compensated.

It should be noted that the specific switching control for the first air-cooling and freezing operation and the second air-cooling and freezing operation is described later.

<Air-Heating Operation>

Figure 6:
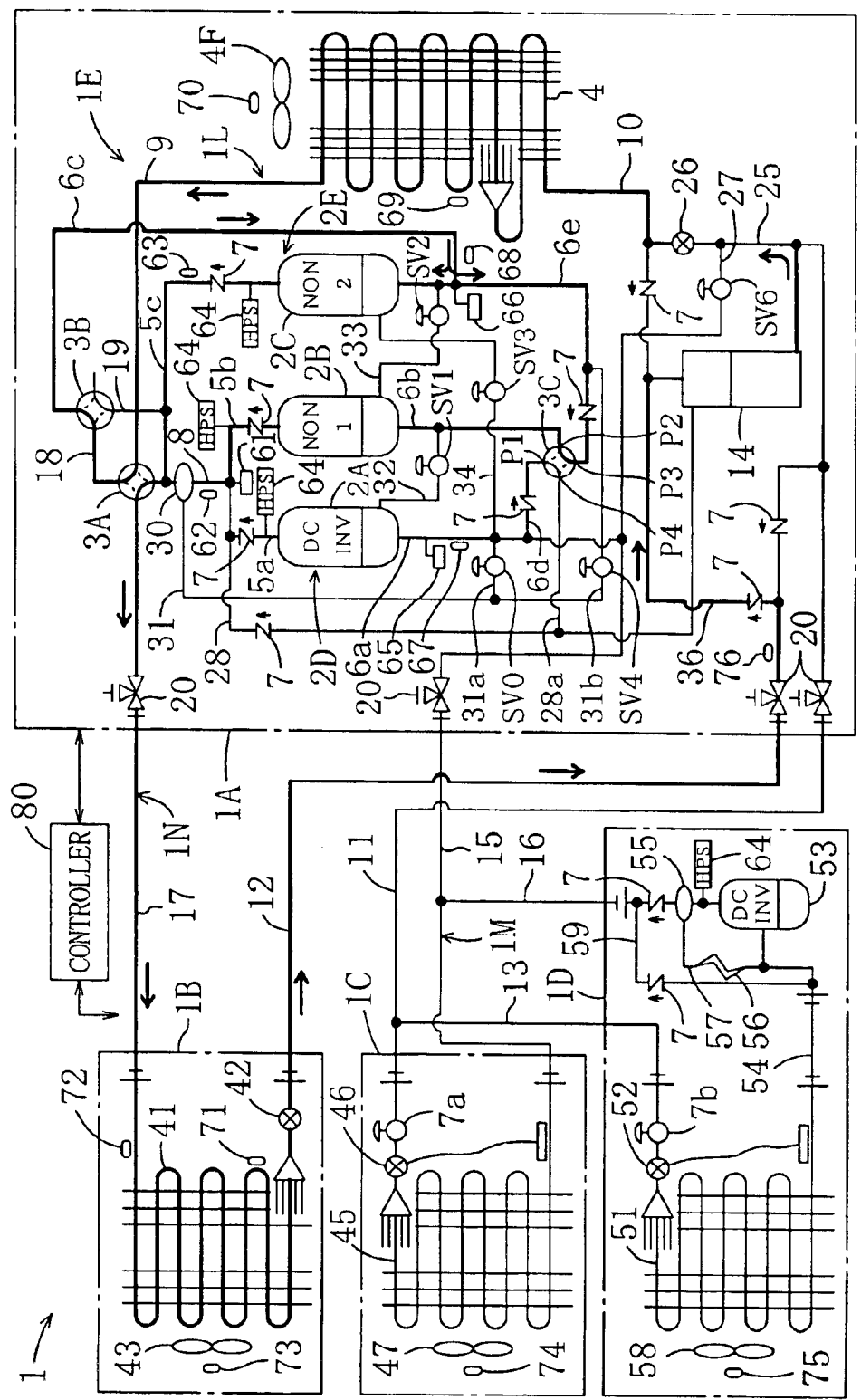
FIG. 6 is a refrigerant circuit diagram for illustrating how an air-heating operation is carried out.

In the air-heating operation, only the air-heating operation of the indoor unit (1B) is carried out. During this air-heating operation, as shown in FIG. 6, the inverter compressor (2A) forms the compressor mechanism (2D) in the first channel, and the first non-inverter compressor (2B) and second non-inverter compressor (2C) form the compressor mechanism (2E) in the second channel. In addition, only the first non-inverter compressor (2B) and second non-inverter compressor (2C), serving as the compressor mechanism (2E) in the second channel, are driven.

Further, as indicated by the associated solid lines in FIG. 6, the first four-way selector valve (3A) is switched to the second state, the second four-way selector valve (3B) is switched to the first state, and the third four-way selector valve (3C) is switched to the second state. On the other hand, the solenoid valve (7a) of the cold storage unit (1C) and the solenoid valve (7b) of the freezing unit (1D) are closed.

Furthermore, a superheat control based on the pressure equivalent saturation temperature obtained by the low-pressure pressure sensor (66), and the temperature detected by the suction temperature sensor (68) is performed for the opening of the outdoor expansion valve (26). A supercooling control based on the temperatures detected by the indoor heat exchanger sensor (71) and liquid temperature sensor (76) is performed for the opening of the indoor expansion valve (42). The control of the openings of the outdoor expansion valve (26) and indoor expansion valve (42) is carried out similarly in an air-heating mode described below.

In such a situation, a refrigerant discharged from each of the first non-inverter compressor (2B) and second non-inverter compressor (2C) is allowed to flow from the first four-way selector valve (3A) to the indoor heat exchanger (41) via the connecting gas pipe (17), and is condensed. The condensed liquid refrigerant flows through the second connecting liquid pipe (12), and then flows into the receiver (14) through the branch liquid pipe (36). Thereafter, the liquid refrigerant flows into the outdoor heat exchanger (4) via the outdoor expansion valve (26) of the auxiliary liquid pipe (25) and evaporates. The evaporated gas refrigerant flows from the outdoor gas pipe (9) to the suction pipe (6c) of the second non-inverter compressor (2C) via the first four-way selector valve (3A) and second four-way selector valve (3B), and returns to the first non-inverter compressor (2B) and second non-inverter compressor (2C). By repeating this circulation, the interior of the room is air-heated.

It should be noted that only one of the compressors (2B, 2C) may be operated as in an air-cooling operation.

<First Air-Heating and Freezing Operation>

Figure 7:
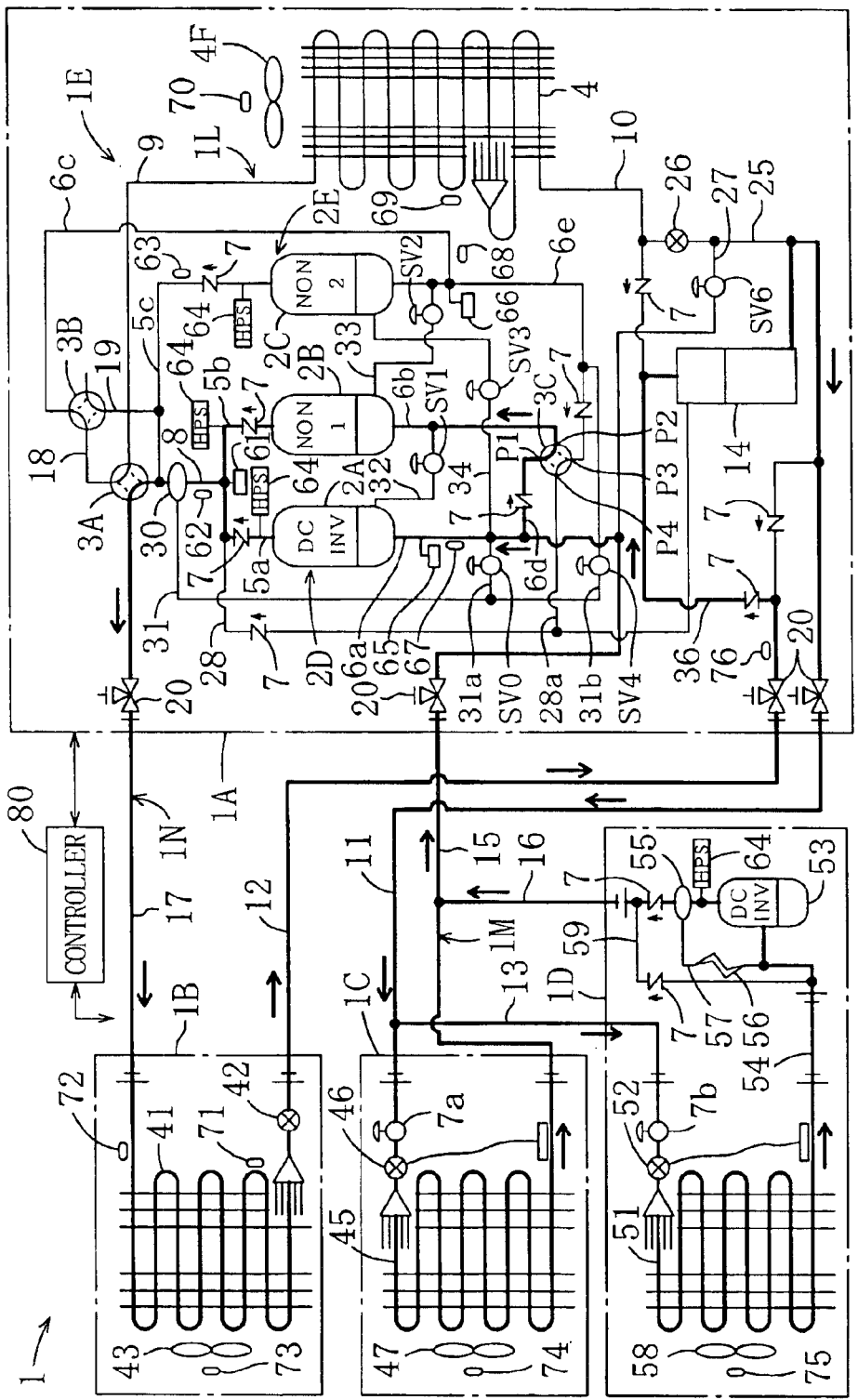
FIG. 7 is a refrigerant circuit diagram for illustrating how a first air-heating and freezing operation is carried out.

The first air-heating and freezing operation is a heat recovery operation in which the air-heating operation of the indoor unit (1B) and the cooling operations of the cold storage unit (1C) and the freezing unit (1D) are carried out without using the outdoor heat exchanger (4). During this first air-heating and freezing operation, as shown in FIG. 7, the inverter compressor (2A) and first non-inverter compressor (2B) form the compressor mechanism (2D) in the first channel, and the second non-inverter compressor (2C) forms the compressor mechanism (2E) in the second channel. In addition, not only the inverter compressor (2A) and first non-inverter compressor (2B) are driven, but also the booster compressor (53) is driven. The second non-inverter compressor (2C) is deactivated.

Further, as indicated by the associated solid lines in FIG. 7, the first four-way selector valve (3A) is switched to the second state, while the second four-way selector valve (3B) and third four-way selector valve (3C) are each switched to the first state. Furthermore, the solenoid valve (7a) of the cold storage unit (1C) and the solenoid valve (7b) of the freezing unit (7D) are opened while the outdoor expansion valve (26) is closed.

In such a situation, a refrigerant discharged from each of the inverter compressor (2A) and the first non-inverter compressor (2B) is allowed to flow from the first four-way selector valve (3A) to the indoor heat exchanger (41) via the connecting gas pipe (17), and is condensed. The condensed liquid refrigerant flows from the second connecting liquid pipe (12) to the first connecting liquid pipe (11) via the receiver (14).

A part of the liquid refrigerant flowing through the first connecting liquid pipe (11) is allowed to flow into the cold storage heat exchanger (45) via the cold storage expansion valve (46) and evaporate. On the other hand, the other part of the liquid refrigerant flowing through the first connecting liquid pipe (11) is allowed to flow through the branch liquid pipe (13), and to flow into the freezing heat exchanger (51) via the freezing expansion valve (52) and evaporate. The gas refrigerant evaporated in the freezing heat exchanger (51) is sucked into the booster compressor (53) and compressed, and is then discharged to the branch gas pipe (16).

The gas refrigerant evaporated in the cold storage heat exchanger (45) and the gas refrigerant discharged from the booster compressor (53) are joined in the low-pressure gas pipe (15) and returned to the inverter compressor (2A) and first non-inverter compressor (2B). By repeating this circulation, the inside of the store is air-heated, and at the same time, the inside of the showcase for cold storage and the inside of the showcase for freezing are cooled. That is, the cooling capacity (evaporation heat) of the cold storage unit (1C) and freezing unit (1D), and the air-heating capacity (condensation heat) of the in door unit (1B) are balanced, thus carrying out a 100% heat recovery.

<Second Air-Heating and Freezing Operation>

Figure 8:
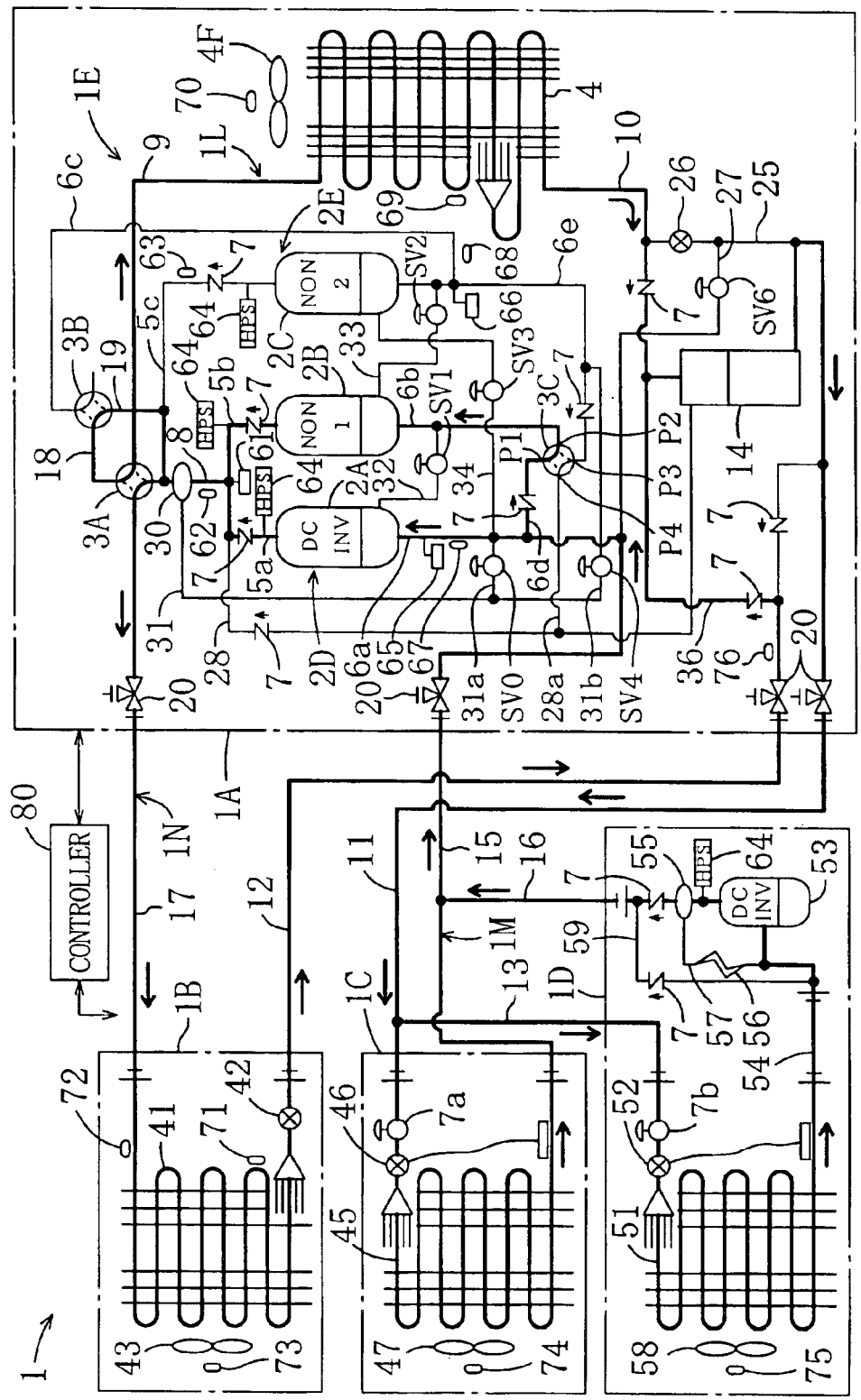
FIG. 8 is a refrigerant circuit diagram for illustrating how a second air-heating and freezing operation is carried out.

The second air-heating and freezing operation is an operation carried out when the air-heating capacity of the indoor unit (1B) is excessive during the first air-heating and freezing operation. During this second air-heating and freezing operation, as shown in FIG. 8, the inverter compressor (2A) and first non-inverter compressor (2B) form the compressor mechanism (2D) in the first channel, and the second non-inverter compressor (2C) forms the compressor mechanism (2E) in the second channel. In addition, not only the inverter compressor (2A) and first non-inverter compressor (2B) are driven, but also the booster compressor (53) is driven. The second non-inverter compressor (2C) is deactivated.

Since the second air-heating and freezing operation is an operation carried out when the air-heating capacity is excessive during the first air-heating and freezing operation, the second air-heating and freezing operation is similar to the first air-heating and freezing operation with the exception that the second four-way selector valve (3B) Is switched to the second state as indicated by the associated solid lines in FIG. 8.

Accordingly, a part of the refrigerant discharged from each of the inverter compressor (2A) and first non-inverter compressor (2B) flows into the indoor heat exchanger (41) and condenses as in the first air-heating and freezing operation. The condensed liquid refrigerant flows from the second connecting liquid pipe (12) to the receiver (14) via the branch liquid pipe (36), and then flows through the first connecting liquid pipe (11).

On the other hand, the other part of the refrigerant discharged from each of the inverter compressor (2A) and first non-inverter compressor (2B) flows from the auxiliary gas pipe (19) to the outdoor gas pipe (9) via the second four-way selector valve (3B) and first four-way selector valve (3A), and condenses in the outdoor heat exchanger (4). The condensed liquid refrigerant flows through the liquid pipe (10), joins the liquid refrigerant from the second connecting liquid pipe (12) to flow into the receiver (14), and then flows through the first connecting liquid pipe (11).

Thereafter, a part of the liquid refrigerant flowing through the first connecting liquid pipe (11) is allowed to flow into the cold storage heat exchanger (45) and evaporate. On the other hand, the other part of the liquid refrigerant flowing through the first connecting liquid pipe (11) is allowed to flow into the freezing heat exchanger (51) and evaporate, and is then sucked into the booster compressor (53). The gas refrigerant evaporated in the cold storage heat exchanger (45) and the gas refrigerant discharged from the booster compressor (53) are joined in the low-pressure gas pipe (15) and returned to the inverter compressor (2A) and first non-inverter compressor (2B). By repeating this circulation, the inside of the store is air-heated, and at the same time, the inside of the showcase for cold storage and the inside of the showcase for freezing are cooled. That is, the cooling capacity (evaporation heat) of the cold storage unit (1C) and freezing unit (1D), and the air-heating capacity (condensation heat) of the indoor unit (1B) are not balanced, and the excessive condensation heat is discharged to the outdoors through the outdoor heat exchanger (4).

<Third Air-Heating and Freezing Operation>

Figure 9:
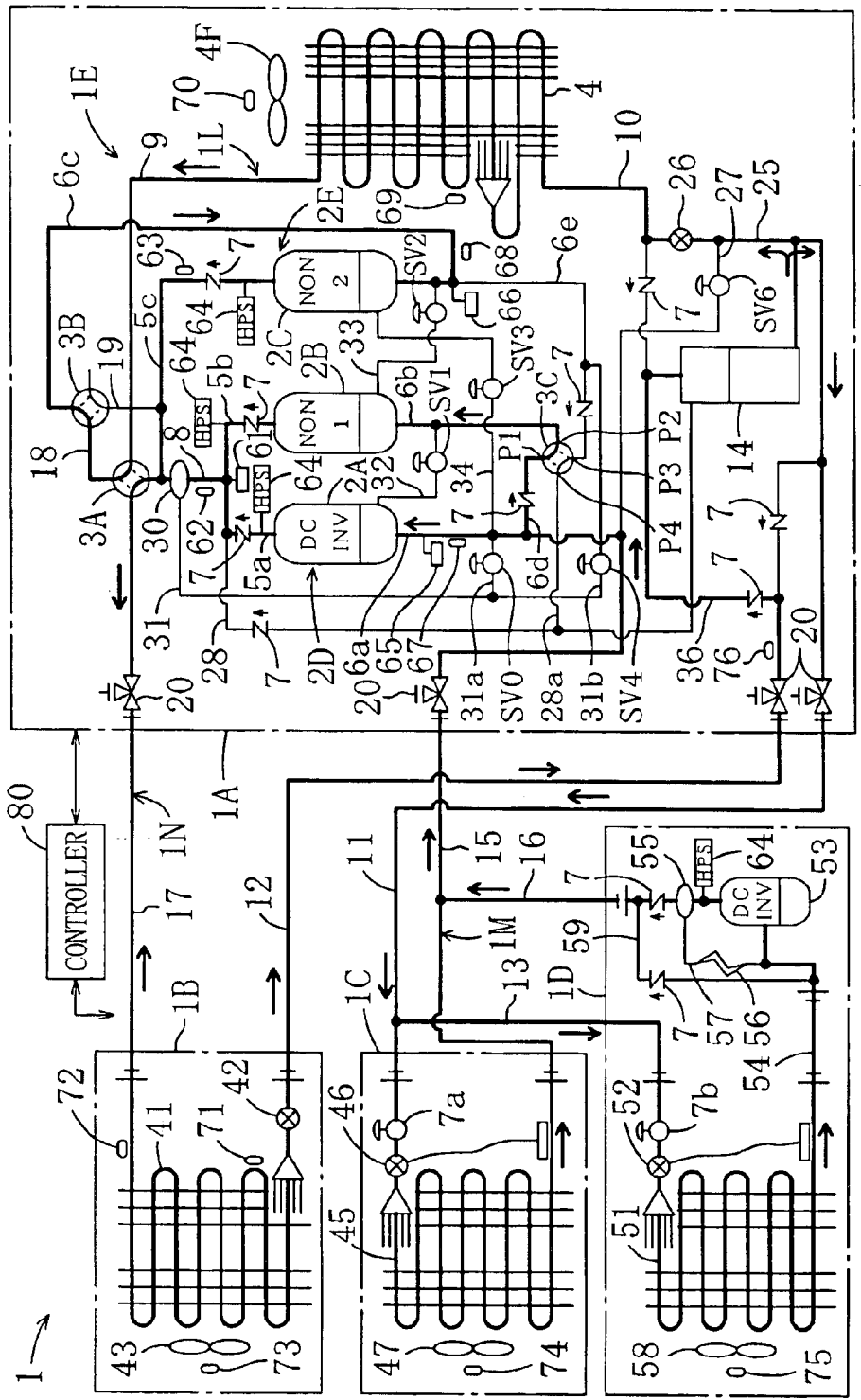
FIG. 9 is a refrigerant circuit diagram for illustrating how a third air-heating and freezing operation is carried out.

The third air-heating and freezing operation is an operation carried out when the air-heating capacity of the indoor unit (1B) is deficient during the first air-heating and freezing operation. During this third air-heating and freezing operation, as shown in FIG. 9, the inverter compressor (2A) and first non-inverter compressor (2B) form the compressor mechanism (2D) in the first channel, and the second non-inverter compressor (2C) forms the compressor mechanism (2E) in the second channel. In addition, not only the inverter compressor (2A), first non-inverter compressor (2B) and second non-inverter compressor (2C) are driven, but also the booster compressor (53) is driven.

Since the third air-heating and freezing operation is an operation carried out when the air-heating capacity is deficient, i.e., when the evaporation heat is deficient, during the first air-heating and freezing operation, the third air-heating and freezing operation is similar to the first air-heating and freezing operation with the exceptions that the opening of the outdoor expansion valve (26) is controlled, and the second non-inverter compressor (2C) is driven.

Accordingly, a refrigerant discharged from each of the inverter compressor (2A), first non-inverter compressor (2B) and second non-inverter compressor (2C) flows into the indoor heat exchanger (41) via the connecting gas pipe (17) and condenses as in the first air-heating and freezing operation. The condensed liquid refrigerant flows from the second connecting liquid pipe (12) to the receiver (14) via the branch liquid pipe (36).

Thereafter, a part of the liquid refrigerant from the receiver (14) flows through the first connecting liquid pipe (11), and a part of the liquid refrigerant flowing through the first connecting liquid pipe (11) is allowed to flow into the cold storage heat exchanger (45) and evaporate. Furthermore, the other part of the liquid refrigerant flowing through the first connecting liquid pipe (11) is allowed to flow into the freezing heat exchanger (51) and evaporate, and is then sucked into the booster compressor (53). The gas refrigerant evaporated in the cold storage heat exchanger (45) and the gas refrigerant discharged from the booster compressor (53) are joined in the low-pressure gas pipe (15) and returned to the inverter compressor (2A) and first non-inverter compressor (2B).

On the other hand, the other part of the liquid refrigerant from the receiver (14) flows into the outdoor heat exchanger (4) via the liquid pipe (10) and evaporates. The evaporated gas refrigerant flows through the outdoor gas pipe (9), flows through the suction pipe (6c) of the second non-inverter compressor (2C) via the first four-way selector valve (3A) and second four-way selector valve (3B), and then returns to the second non-inverter compressor (2C).

By repeating this circulation, the inside of the store is air-heated, and at the same time, the inside of the showcase for cold storage and the inside of the showcase for freezing are cooled. That is, the cooling capacity (evaporation heat) of the cold storage unit (1C) and freezing unit (1D), and the air-heating capacity (condensation heat) of the indoor unit (1B) are not balanced, and the deficient evaporation heat is made up using the outdoor heat exchanger (4).

<Switching of Second Compressor>

As in the description made about each of the operation modes described above, by controlling the third four-way selector valve (3C), the first non-inverter compressor (2B) as the second compressor means is used in a switchable manner between the first channel side circuit for a cold storage/freezing operation and the second channel side circuit for an air conditioning operation.

The first non-inverter compressor (2B) is used in the above-described eight operating patterns in the following manner: the first non-inverter compressor (2B) is used for a cold storage/freezing operation during the freezing operation (FIG. 3), during the first air-cooling and freezing operation (FIG. 4), during the first air-heating and freezing operation (FIG. 7), during the second air-heating and freezing operation (FIG. 8), and during the third air-heating and freezing operation (FIG. 9); and the first non-inverter compressor (2B) is used for an air conditioning operation during the air-cooling operation (FIG. 2), during the second air-cooling and freezing operation (FIG. 5), and during the air-heating operation (FIG. 6). In other words, the first non-inverter compressor (2B) forms the compressor mechanism (2D) in the first channel by switching the third four-way selector valve (3C) to the first state (hereinafter, called "OFF state") mainly when the first non-inverter compressor (2B) is used for a cold storage/freezing operation, and the first non-inverter compressor (2B) forms the compressor mechanism (2E) in the second channel by switching the third four-way selector valve (3C) to the second state (hereinafter, called "ON state") mainly when the first non-inverter compressor (2B) is used for an air conditioning operation.

Figure 10:
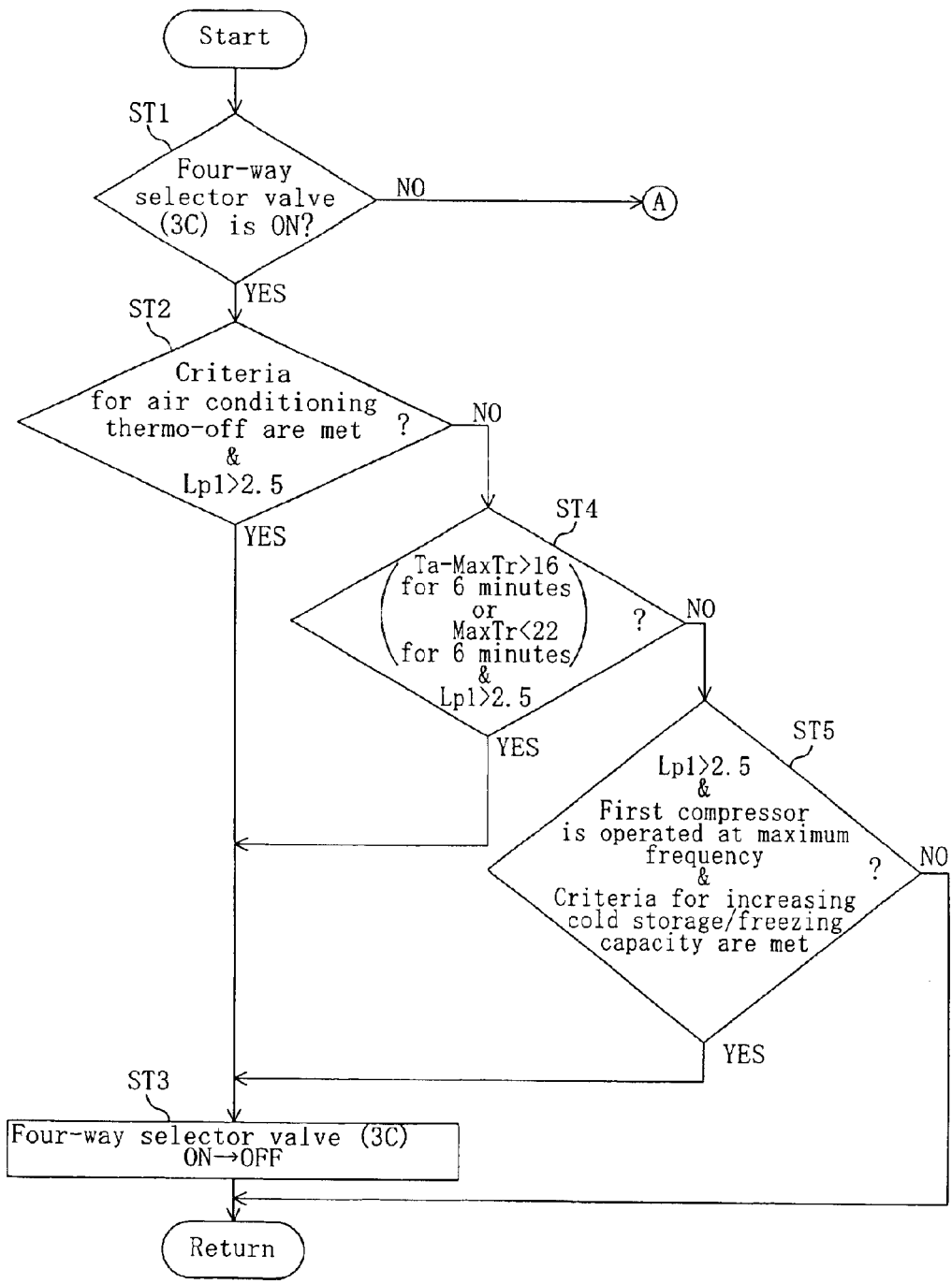
FIG. 10 is a flowchart for illustrating the first half of the ON-OFF switching control of a third four-way selector valve.
Figure 11:
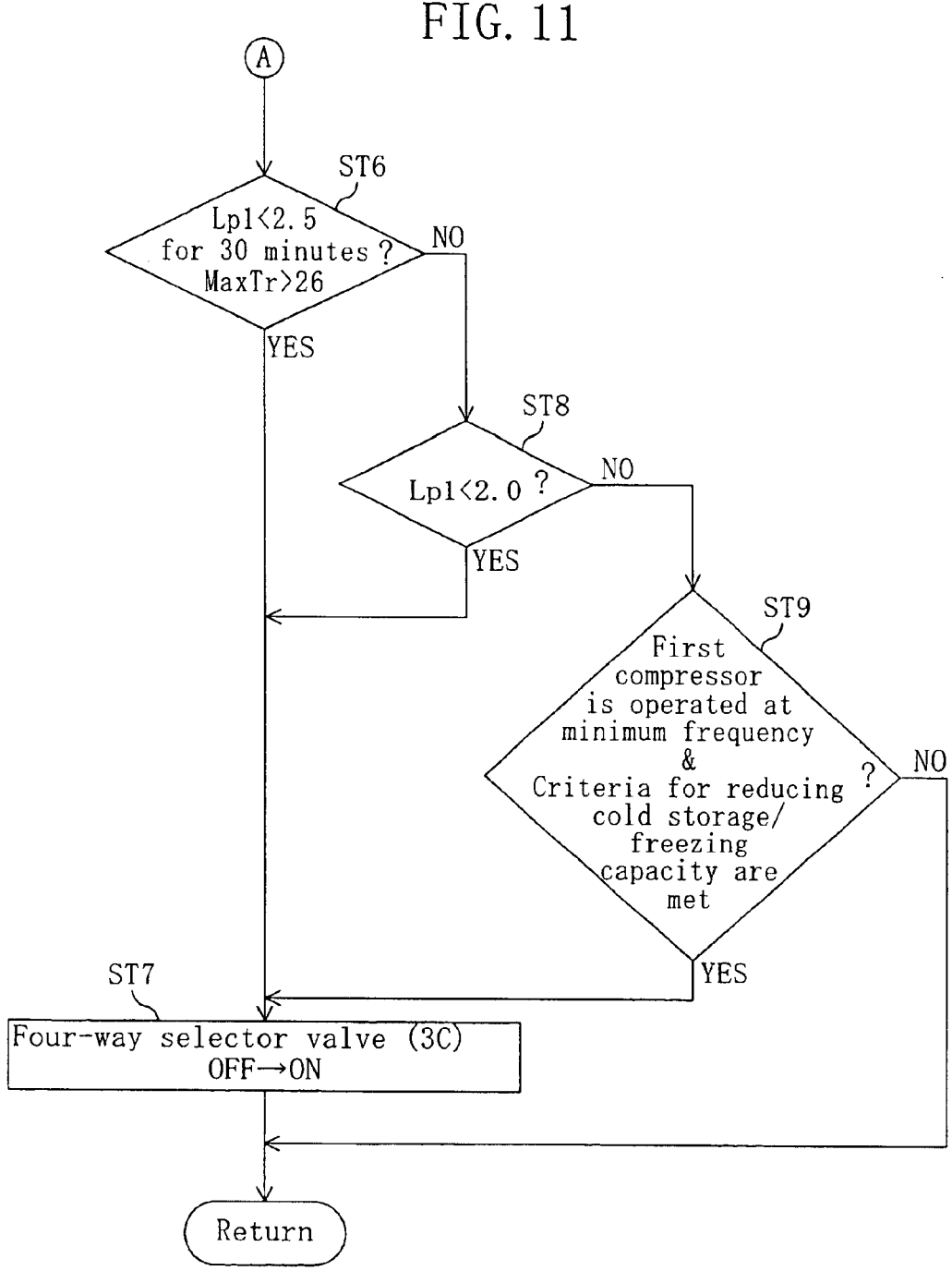
FIG. 11 is a flowchart for illustrating the latter half of the ON-OFF switching control of the third four-way selector valve.

Next, with reference to the flowcharts shown in FIGS. 10 and 11, description will be made about the ON-OFF switching control of the third four-way selector valve (3C) for switching the first non-inverter compressor (2B) between a cold storage/freezing operation and an air conditioning operation. It should be noted that, in the following, the description will be made about the control over the switching between the first air-cooling and freezing operation (FIG. 4) and the second air-cooling and freezing operation (FIG. 5).

In this flowchart, in step ST1, it is first determined whether or not the third four-way selector valve (3A) is in ON state, i.e., whether or not the first non-inverter compressor (2B) is used for an air condition operation (whether or not the operation mode is the second air-cooling and freezing operation).

If the determination result is "YES", the process goes to step ST2 in which it is determined whether or not the air conditioning capacity is sufficient based on whether or not the criteria for an air conditioning thermo-off (suspension) are met, and it is also determined whether or not the cold storage/freezing capacity is deficient based on whether or not a cold storage/freezing side low pressure (LP1) is higher than 2.5 Kg/cm$^2$ (245 KPa). In this case, if the determination result is "YES", the air conditioning capacity is sufficient and the cold storage/freezing capacity is deficient; therefore, the process goes to step ST3 in which the third four-way selector valve (3C) is set to be in the OFF state, and the first non-inverter compressor (2B) is switched to the channel for a cold storage/freezing operation (i.e., the operation mode is switched to the first air-cooling and freezing operation).

To the contrary, if the determination result in step ST2 is "NO", the process goes to step ST4. In step ST4, it is determined whether a requirement that a difference between an outside air temperature (Ta) and an indoor suction temperature (Tr) be higher than 16° C. for continuously 6 minutes or more, or another requirement that the indoor suction temperature (Tr) be lower than 22° C. for continuously 6 minutes or more is satisfied, and it is also determined whether or not the cold storage/freezing side low pressure (LP1) is higher than 2.5 Kg/cm$^2$ (245 KPa). If one of the above-described two requirements concerning the indoor temperature (Tr) is satisfied, it can be judged that the interior of the room is sufficiently cool; therefore, the process goes to step ST3 in which the first non-inverter compressor (2B) is switched to the channel for a cold storage/freezing operation. It should be noted that the indoor suction temperature is represented by (MaxTr) in step ST4 because the description is made on the supposition that a plurality of the indoor units (1B) are connected.

If the determination result is "NO" in step ST4, the process goes to step ST5. In step ST5, it is determined whether or not the following three requirements are satisfied: a requirement that the cold storage/freezing side low pressure (LP1) be higher than 2.5 Kg/cm$^2$ (245 KPa); another requirement that the first compressor means (inverter compressor) (2A) be operated at a maximum frequency; and still another requirement that the criteria for increasing the cold storage/freezing capacity be met. If all the requirements are satisfied, the process goes to ST3 in which the first non-inverter compressor (2B) is switched to the channel for a cold storage/freezing operation. That is, the air conditioning capacity is not necessarily satisfactory in this case; however, if the cold storage/freezing capacity is deficient even though the inverter compressor (2A) is operated at the maximum frequency, the first non-inverter compressor (2B) is switched to the channel for a cold storage/freezing operation, i.e., the first channel, irrespective of the state of the channel for an air conditioning operation. Thus, the operation in which a higher priority is given to a cold storage/freezing operation is carried out to maintain the quality of product. On the other hand, if the determination result in step ST5 is "NO", the cold storage/freezing capacity is not deficient; therefore, the switching of the third four-way selector valve (3C) in step ST3 is not performed, and the process returns to step ST1.

Next, if the determination result in step ST1 is "NO", the apparatus is in a state in which the third four-way selector valve (3C) is in OFF state, and the first non-inverter compressor (2B) is used in the channel for a cold storage/freezing operation (i.e., the first air-cooling and freezing operation is carried out). In this case, the process goes to step ST6 shown in FIG. 11 in which whether or not the cold storage/freezing side is sufficiently cool is determined based on whether or not the cold storage/freezing side low pressure (LP1) is lower than 2.5 Kg/cm$^2$ (245 KPa) for continuously 30 minutes or more, and furthermore, whether or not the air-cooling capacity is required is determined based on whether or not the indoor temperature (MaxTr) is equal to or higher than 26° C. If the determination result is "YES", the process goes to step ST7 in which the third four-way selector valve (3C) is switched from OFF state to ON state, and the first non-inverter compressor (2B) is used in the channel for an air conditioning operation (i.e., the second air-cooling and freezing operation is carried out).

If the determination result in step ST6 is "NO", the process goes to step ST8 in which whether or not the cold storage/freezing side low pressure (LP1) is lower than 2.0 Kg/cm$^2$ (196 KPa). If this low pressure (LP1) is lower than 2.0 Kg/cm$^2$ (196 KPa), almost no freezing/cold storage capacity is required because the state of the freezing/cold storage operation is close to thermo-off. Therefore, in that case, irrespective of the state of the channel for an air conditioning operation, the process goes to step ST7 in which the third four-way selector valve (3C) is switched from OFF state to ON state so that the first non-inverter compressor (2B) can be used in the channel for an air conditioning operation.

Furthermore, if the determination result in step ST8 is "NO", the process goes to step ST9. In step ST9, it is determined whether or not the inverter compressor (2A) is operated at the minimum frequency, and the criteria for reducing the cold storage/freezing capacity are met. If the determination result is "YES", the cold storage/freezing capacity is excessive; therefore, in step ST7, the third four-way selector valve (3C) is switched from OFF state to ON state so that the first non-inverter compressor (2B) is used in the channel for an air conditioning operation. To the contrary, if the determination result in step ST9 is "NO", the cold storage/freezing capacity is not excessive; therefore, the switching of the third four-way selector valve (3C) in step ST7 is not performed, and the process returns to step ST1 shown in FIG. 10. That is, although there is a possibility that the air conditioning capacity might be deficient in step ST9, the control in which a higher priority is given to a cold storage/freezing operation is carried out even in that case.

As described above, the first non-inverter compressor (2B) can be used selectively in the first channel side circuit for a cold storage/freezing operation and in the second channel side circuit for an air conditioning operation only by switching the third four-way selector valve (3C) based on the cold storage/freezing capacity and the air conditioning capacity.

Effects of Embodiment

According to the present embodiment, in the state where the refrigerant discharged from the inverter compressor (2A) circulates only through the first channel side circuit while the refrigerant discharged from the second non-inverter compressor (2C) circulates through the second channel side circuit, the refrigerant discharged from the first non-inverter compressor (2B) is allowed to switch between a state in which the refrigerant circulates through the first channel side circuit and another state in which the refrigerant circulates through the second channel side circuit. In other words, the inverter compressor (2A) is fixedly used in the first channel, the second non-inverter compressor (2C) is fixedly used in the second channel, and the first non-inverter compressor (2B) is used in a switchable manner between both of the channels.

Since the method for switching only the first non-inverter compressor (2B) is adopted as described above, the combination pattern of the three compressors (2A, 2B, 2C) can be simpler than before, and the pipe arrangement at the suction side can be simplified. Besides, since the number of the operating patterns of the compressors (2A, 2B, 2C) can be reduced, the control thereof can be carried out with ease.

In addition, only by switching the third four-way selector valve (3C) between the first state and the second state in this case, the second compressor means (2B) can be switched between the first channel and the second channel; therefore, the operating status can be switched by a simple switching control. Moreover, since a higher priority is given to a cold storage/freezing operation, the quality of product can be maintained with certainty.

Further, the gas refrigerant evaporated in each of the cold storage heat exchanger (45) and freezing heat exchanger (51), and the gas refrigerant evaporated in the indoor heat exchanger (41) are separately circulated through the first channel side circuit and the second channel side circuit, and sucked into the first channel side compressor mechanism (2D) and the second channel side compressor mechanism (2E), thus carrying out the operation in which the refrigerants are evaporated at different temperatures in the heat exchangers (41, 45, 51). Accordingly, the evaporation temperature in the indoor heat exchanger (41) required in an air-cooling operation, and the evaporation temperature in each of the cold storage heat exchanger (45) and freezing heat exchanger (51) required in a cooling operation can be separately optimized, and thus an increase in COP can be achieved.

Other Embodiments

In the present invention, the following modifications may be made to the above-described embodiment.

For example, although the first compressor means (2A) is formed by using an inverter compressor while the second compressor means (2B) and third compressor means (2C) are each formed by using a non-inverter compressor in the present embodiment, the three compressor means may each be formed by an inverter compressor, or the combination of inverter and non-inverter compressors may be changed.

Alternatively, the first compressor means (2A), second compressor means (2B) and third compressor means (2C)

may each be formed by a single compressor, or may each be formed by a plurality of compressors. For example, in the case where the total number of compressors is five, the following combinations may be employed: <a> the first compressor means (2A) is formed by two compressors, the second compressor means (2B) is formed by a single compressor, and the third compressor means (2C) is formed by two compressors; <b> the first compressor means (2A) is formed by two compressors, the second compressor means (2B) is formed by two compressors, and the third compressor means (2C) is formed by a single compressor; <c> the first compressor means (2A) is formed by a single compressor, the second compressor means (2B) is formed by three compressors, and the third compressor means (2C) is formed by a single compressor; and <d> the three compressor means are formed by any combination other than the above combinations. Optionally, the total number of compressors is not limited to five, but may be appropriately changed. In such a case, whether to use a single compressor or a plurality of compressors to form each of the compressor means (2A, 2B, 2C) may be appropriately changed.

Besides, although the four-way selector valve (3C) is used on a low-pressure side of the compressor mechanisms (2D, 2E) so that the second compressor means (2B) is switched between the channel for an air conditioning operation and the channel for a cold storage/freezing operation in the present embodiment, the arrangement may be employed in which a combination of a plurality of solenoid valves is used instead of the four-way selector valve (3C).

Furthermore, although the description has been made about the refrigerating apparatus for carrying out air conditioning, cold storage and freezing operations in the above-described embodiment, the overall arrangement of the apparatus may be appropriately changed so that the apparatus provides a system for carrying out air conditioning and cold storage operations, for example.

Industrial Applicability

As described above, the present invention is usefully applicable to refrigerating apparatuses.

What is claimed is:

1. A refrigerating apparatus in which compressor mechanisms of a two-channel refrigerant circuit comprising utilization side heat exchangers for two channels are formed by combining three compressor means, the apparatus characterized in that the compressor means comprise:
  a first compressor means used only for the utilization side heat exchangers in the first channel of the circuit;
  a second compressor means having a switchable operative connection to a selected one of: the utilization side heat exchangers in the first channel of the circuit, and the utilization side heat exchanger in the second channel of the circuit; and
  a third compressor means used only for the utilization side heat exchanger in the second channel of the circuit.

2. The refrigerating apparatus according to claim 1, characterized in that:

the suction side of the compressor mechanisms is connected with a four-way selector valve, and the four-way selector valve is formed to be switchable between a first state in which a first port and a second port are communicated with each other and a third port and a fourth port are communicated with each other, and a second state in which the first port and fourth port are communicated with each other and the second port and third port are communicated with each other;

a low-pressure pipe in the first channel of the circuit is connected to a suction pipe of the first compressor means, and the first port is connected with a branch pipe of the suction pipe of the first compressor means via a check valve for allowing the flow of a refrigerant toward the first port;

the second port is connected with a suction pipe of the second compressor means;

low-pressure pipes in the second channel of the circuit are connected to a suction pipe of the third compressor means, and the third port is connected with a branch pipe of the suction pipe of the third compressor means via another check valve for allowing the flow of a refrigerant toward the third port;

the fourth port is connected with a pipe at a high pressure side of the refrigerant circuit; and the apparatus is formed to allow switching between a status in which a refrigerant discharged from the second compressor means circulates through the first channel of the circuit by setting the four-way selector valve to the first state, and another status in which the refrigerant discharged from the second compressor means circulates through the second channel of the circuit by setting the four-way selector valve to the second state.

3. The refrigerating apparatus according to claim 1, characterized in that:

the utilization side heat exchangers in the first channel of the circuit are cooling heat exchangers used for a cold storage/freezing operation, and the utilization side heat exchanger in the second channel of the circuit is an air conditioning heat exchanger used for an air conditioning operation; and the refrigerant circuit is formed so that refrigerants in the utilization side heat exchangers in the first channel and the utilization side heat exchanger in the second channel are evaporated at different temperatures.

4. The refrigerating apparatus according to claim 3, characterized in that the refrigerant circuit is formed so that a selection can be made from: an air conditioning operation in which a refrigerant discharged from at least one of the second compressor means and the third compressor means circulates through the second channel of the circuit; a cooling operation in which a refrigerant discharged from at least one of the first compressor means the second compressor means circulates through the first channel of the circuit; and an air conditioning and cooling operation in which a refrigerant discharged from the third compressor means circulates through the second channel of the circuit, a refrigerant discharged from the first compressor means circulates through the first channel of the circuit, and a refrigerant discharged from the second compressor means is allowed to circulate through the first channel or the second channel of the circuit.

5. The refrigerating apparatus according to claim 1, characterized in that the first compressor means is formed by a variable displacement compressor, and the second compressor means and the third compressor means are each formed by a fixed displacement compressor.

6. The refrigerating apparatus according to claim 1, characterized in that the apparatus is formed to operate so that if a capacity deficiency occurs either in the utilization side heat exchangers in the first channel of the circuit, or in the utilization side heat exchanger in the second channel of the circuit, the second compressor means is switched to the channel suffering the capacity deficiency.

7. The refrigerating apparatus according to claim 6, characterized in that:

during operation, a higher priority is given to the capacity of the utilization side heat exchangers in the first channel of the circuit than to that of the utilization side heat exchanger in the second channel of the circuit; and the apparatus is formed to operate so that if a capacity deficiency occurs in the utilization side heat exchangers in the first channel of the circuit, the second compressor means is switched to the first channel irrespective of the state of the utilization side heat exchanger in the second channel of the circuit.

8. A refrigerating apparatus comprising:

a utilization side heat exchanger in a first channel of the refrigerating apparatus;

a utilization side heat exchanger in a second channel of the refrigerating apparatus;

first compressor means operatively connected to the utilization side heat exchangers in the first channel;

second compressor means operatively connected to the utilization side heat exchanger in the second channel; and third compressor means having a switchable operative connection to a selected one of: the utilization side heat exchanger in the first channel, and the utilization side heat exchanger in the second channel.

9. The refrigerating apparatus according to claim 8, further comprising:

a four-way selector valve operatively connected to a suction side of each of the first, second, and third compressor means, the four-way selector valve being selectively set to one of the following states:

a first state in which the third compressor means is operatively connected to the utilization side heat exchanger in the first channel, thereby allowing refrigerant discharged from the third compressor means to circulate through the first channel, and a second state in which the third compressor means is operatively connected to the utilization side heat exchanger in the second channel, thereby allowing refrigerant discharged from the third compressor means to circulate through the second channel.

10. The refrigerating apparatus according to claim 9, wherein the first compressor means includes a suction pipe operatively connected to a low-pressure pipe in the first channel, the second compressor means includes a suction pipe operatively connected to a low-pressure pipe in the second channel, and the first the four-way selector valve includes:

a first port operatively connected to a branch pipe of the suction pipe of the first compressor means, thereby allowing refrigerant to flow from the first compressor means to the first port;

a second port operatively connected to a suction pipe of the third compressor means;

a third port operatively connected to a branch pipe of the suction pipe of the second compressor means, thereby allowing refrigerant to flow from the second compressor means to the second port; and a fourth port operatively connected to a pipe at a high pressure side of the refrigerant apparatus.

11. The refrigerant apparatus of claim 10, wherein the four-way selector valve is configured so that:

when the four-way selector valve is set to the first state, the first port is operatively connected to the second port, and the third port is operatively connected to the fourth port; and when the four-way selector valve is set to the second state, the first port is operatively connected to the fourth port, and the second port is operatively connected to the third port.

12. The refrigerating apparatus according to claim 10, the first channel including multiple utilization side heat exchangers, wherein:

the four-way selector valve is switched to the first state in response to a capacity deficiency in at least one of the utilization side heat exchangers in the first channel, and the four-way selector valve is switched to the second state in response to a capacity deficiency in the utilization side heat exchanger in the second channel.

13. The refrigerating apparatus according to claim 9, further comprising an auxiliary selector valve, wherein the auxiliary selector valve operatively connects a pipe in the second channel to a selected one of the suction pipe of the second compressor means and a discharge pipe of the second compressor means.

14. The refrigerating apparatus according to claim 13, wherein the auxiliary selector valve is a second four-way selector valve, which is configured to:

operatively connect the pipe in the second channel to the suction pipe of the second compressor means when an air cooling operation is being performed, thereby causing the pipe in the second channel to be a low-pressure pipe, and operatively connect the pipe in the second channel to the discharge pipe of the second compressor means when an air heating operation is being performed, thereby causing the pipe in the second channel to be a high-pressure pipe.

15. The refrigerating apparatus according to claim 14, further comprising a second auxiliary selector valve, wherein the second auxiliary selector valve is configured to operatively connect a branch pipe of the discharge pipe of the second compressor means to an outdoor heat exchanger in response to a capacity deficiency occurring in the utilization heat exchanger in the second channel when the air heating operation is being performed.

16. The refrigerating apparatus according to claim 8, wherein:

the first channel includes two cooling utilization side heat exchangers for cold storage/freezing operation, and the utilization side heat exchanger in the second channel is an air conditioning heat exchanger for air conditioning operation, and the first and second channels are configured so that refrigerants in the utilization side heat exchangers in the first channel evaporate at a different temperature than a refrigerant in the utilization side heat exchanger of the second channel.

17. The refrigerating apparatus according to claim 16, wherein the apparatus is selectively operated in accordance with one of the following:

an air conditioning operation in which a refrigerant discharged from at least one of the second compressor means and the third compressor means circulates through the second channel of the circuit;

a cooling operation in which a refrigerant discharged from at least one of the first compressor means and the third compressor means circulates through the first channel of the circuit;

and an air conditioning and cooling operation in which a refrigerant discharged from the third compressor means circulates through the second channel of the circuit, a refrigerant discharged from the first compressor means circulates through the first channel of the circuit, and a refrigerant discharged from the second compressor means is allowed to circulate through the first channel or the second channel of the circuit.

18. The refrigerating apparatus according to claim 8, wherein the first compressor means comprises a variable displacement compressor, and the second compressor means and the third compressor means each comprise a fixed displacement compressor.

19. The refrigerating apparatus according to claim 8, the first channel including multiple utilization side heat exchangers, wherein:

the apparatus is configured to switch the third compressor means to a selected one of the first and second channels, the selected channel is the first channel when a capacity deficiency occurs in at least one of the utilization side heat exchangers in the first channel of the circuit, and the selected channel is the second channel when a capacity deficiency occurs in the utilization side heat exchanger in the second channel.

20. The refrigerating apparatus according to claim 19, wherein:

during operation, a higher priority is given to the capacity of the utilization side heat exchanger in the first channel than to the utilization side heat exchanger in the second channel, so that when a capacity deficiency occurs in at least one of the utilization side heat exchangers in the first channel of the circuit, the second compressor means is switched to the first channel regardless of whether the utilization side heat exchanger in the second channel is suffering a capacity deficiency.

\* \* \* \* \*